US007941269B2

(12) United States Patent
Laumeyer et al.

(10) Patent No.: US 7,941,269 B2
(45) Date of Patent: May 10, 2011

(54) NETWORK-BASED NAVIGATION SYSTEM HAVING VIRTUAL DRIVE-THRU ADVERTISEMENTS INTEGRATED WITH ACTUAL IMAGERY FROM ALONG A PHYSICAL ROUTE

(75) Inventors: Robert A. Laumeyer, Minneapolis, MN (US); Jamie E. Retterath, Excelsior, MN (US)

(73) Assignee: Rialcardo Tice B.V. LLC, Dover, DE (US)

( * ) Notice: Subject to any disclaimer, the term of this patent is extended or adjusted under 35 U.S.C. 154(b) by 0 days.

(21) Appl. No.: 12/268,865

(22) Filed: Nov. 11, 2008

(65) Prior Publication Data
US 2009/0125226 A1 May 14, 2009

Related U.S. Application Data

(63) Continuation of application No. 11/382,170, filed on May 8, 2006, now Pat. No. 7,451,041.

(60) Provisional application No. 60/678,847, filed on May 6, 2005.

(51) Int. Cl.
*G01C 21/30* (2006.01)
(52) U.S. Cl. ........................................ 701/209; 701/211
(58) Field of Classification Search .......... 701/208–213, 701/29; 370/278, 463; 709/203, 219, 217
See application file for complete search history.

(56) References Cited

U.S. PATENT DOCUMENTS

| 3,636,250 A | 1/1972 | Haeff |
| 4,348,652 A | 9/1982 | Barnes et al. |
| 4,373,819 A | 2/1983 | Pallotta |

(Continued)

FOREIGN PATENT DOCUMENTS
DE 195 31 766 A1 3/1997
(Continued)

OTHER PUBLICATIONS

Application and File History U.S. Appl. No. 11/382,170, filed May 8, 2006. Inventors: Robert A. Laumeyer and Jamie E. Retterath.

(Continued)

*Primary Examiner* — Brenda Pham
(74) *Attorney, Agent, or Firm* — Stolowitz Ford Cowger LLP

(57) ABSTRACT

A network-based navigation system includes a user interface and a computer server system that can access a map database, an actual imagery database and an advertisement database in order to provide visual route guidance information having virtual drive-thru advertisements integrated with actual imagery from along a physical route. The user interface permits a user to submit a request for navigation information, receive visual route guidance information in response to the request and initiate a drive-thru presentation of at least a portion of a route. The computer server determines at least one route from the map database based on the request from the user and provides route guidance information to the user interface in response. The computer server also identifies actual imagery from the image database associated with the at least one route and selectively replaces at least one polygon region identified in the actual imagery associated with the at least one route with at least one advertisement from the ad database to create a drive-thru presentation with at least one virtual advertisement. At least a portion of the drive-thru presentation is presented to the user interface. In one embodiment, the computer server records a drive-thru charge for the virtual advertisements present in the portion of the drive-thru presentation provided to the user interface.

6 Claims, 10 Drawing Sheets

U.S. PATENT DOCUMENTS

| | | | |
|---|---|---|---|
| 4,491,923 A | 1/1985 | Look | |
| 4,504,913 A | 3/1985 | Miura et al. | |
| 4,721,389 A | 1/1988 | Dejaiffe | |
| 4,726,134 A | 2/1988 | Woltman | |
| 4,920,385 A | 4/1990 | Clark et al. | |
| 4,937,570 A | 6/1990 | Matsukawa et al. | |
| 4,937,950 A | 7/1990 | Farnworth | |
| 5,050,327 A | 9/1991 | Woltman | |
| 5,115,398 A | 5/1992 | De Jong | |
| 5,161,886 A | 11/1992 | De Jon et al. | |
| 5,164,785 A | 11/1992 | Hopkins et al. | |
| 5,353,392 A | 10/1994 | Luquet et al. | |
| 5,373,357 A | 12/1994 | Hopkins et al. | |
| 5,392,365 A | 2/1995 | Steinkirchner | |
| 5,396,431 A | 3/1995 | Shimizu et al. | |
| 5,448,484 A | 9/1995 | Bullock et al. | |
| 5,465,115 A | 11/1995 | Conrad et al. | |
| 5,465,308 A | 11/1995 | Hutcheson et al. | |
| 5,491,517 A | 2/1996 | Kreitman et al. | |
| 5,508,931 A | 4/1996 | Snider | |
| 5,530,549 A | 6/1996 | Brown | |
| 5,533,388 A | 7/1996 | Yamamoto et al. | |
| 5,544,060 A | 8/1996 | Fujii et al. | |
| 5,579,471 A | 11/1996 | Barber et al. | |
| 5,613,055 A | 3/1997 | Shimoura et al. | |
| 5,627,549 A | 5/1997 | Park | |
| 5,627,915 A | 5/1997 | Rosser et al. | |
| 5,633,944 A | 5/1997 | Guibert et al. | |
| 5,633,946 A | 5/1997 | Lachinski et al. | |
| 5,647,058 A | 7/1997 | Agrawal et al. | |
| 5,649,032 A | 7/1997 | Burt et al. | |
| 5,664,948 A | 9/1997 | Dimitriadis et al. | |
| 5,696,503 A | 12/1997 | Nasburg | |
| 5,699,444 A | 12/1997 | Palm | |
| 5,731,766 A | 3/1998 | Akamatsu | |
| 5,739,766 A | 4/1998 | Chaloux | |
| 5,739,773 A | 4/1998 | Morimoto et al. | |
| 5,740,274 A | 4/1998 | Ono et al. | |
| 5,748,109 A | 5/1998 | Kosaka et al. | |
| 5,757,878 A | 5/1998 | Dobbs et al. | |
| 5,764,411 A | 6/1998 | Shanks | |
| 5,790,691 A | 8/1998 | Narayanswamy et al. | |
| 5,793,034 A | 8/1998 | Wesolowicz et al. | |
| 5,802,361 A | 9/1998 | Wang et al. | |
| 5,815,411 A | 9/1998 | Ellenby et al. | |
| 5,818,640 A | 10/1998 | Watanabe et al. | |
| 5,835,489 A | 11/1998 | Moriya et al. | |
| 5,844,699 A | 12/1998 | Usami et al. | |
| 5,852,823 A | 12/1998 | De Bonet | |
| 5,864,630 A | 1/1999 | Cosatto et al. | |
| 5,892,847 A | 4/1999 | Johnson | |
| 5,893,095 A | 4/1999 | Jain et al. | |
| 5,911,139 A | 6/1999 | Jain et al. | |
| 5,915,032 A | 6/1999 | Look | |
| 5,917,436 A | 6/1999 | Endo et al. | |
| 5,938,319 A | 8/1999 | Hege | |
| 5,941,932 A | 8/1999 | Aikawa et al. | |
| 5,941,944 A | 8/1999 | Messerly | |
| 5,945,976 A | 8/1999 | Iwamura et al. | |
| 5,949,914 A | 9/1999 | Yuen | |
| 5,950,190 A | 9/1999 | Yeager et al. | |
| 5,974,521 A | 10/1999 | Akerib | |
| 5,974,876 A | 11/1999 | Hijikata et al. | |
| 5,982,298 A | 11/1999 | Lappenbusch et al. | |
| 5,983,237 A | 11/1999 | Jain et al. | |
| 5,991,085 A | 11/1999 | Rallison | |
| 6,006,161 A | 12/1999 | Katou | |
| 6,011,515 A | 1/2000 | Radcliffe et al. | |
| 6,018,697 A | 1/2000 | Morimoto et al. | |
| 6,023,241 A | 2/2000 | Clapper | |
| 6,023,967 A | 2/2000 | Chung et al. | |
| 6,036,322 A | 3/2000 | Nilsen et al. | |
| 6,038,507 A | 3/2000 | Miyano | |
| 6,048,069 A | 4/2000 | Nagaoka et al. | |
| 6,064,768 A | 5/2000 | Hajj et al. | |
| 6,084,595 A | 7/2000 | Bach et al. | |
| 6,119,065 A | 9/2000 | Shimada et al. | |
| 6,122,520 A | 9/2000 | Want et al. | |
| 6,123,263 A | 9/2000 | Feng | |
| 6,133,947 A | 10/2000 | Mikuni | |
| 6,134,819 A | 10/2000 | McClain et al. | |
| 6,141,014 A | 10/2000 | Endo et al. | |
| 6,141,433 A | 10/2000 | Moed et al. | |
| 6,141,434 A | 10/2000 | Christian et al. | |
| 6,142,871 A | 11/2000 | Inoue | |
| 6,166,813 A | 12/2000 | Roberts | |
| 6,169,552 B1 | 1/2001 | Endo et al. | |
| 6,173,231 B1 | 1/2001 | Chojnacki | |
| 6,182,010 B1 | 1/2001 | Berstis | |
| 6,182,011 B1 | 1/2001 | Ward | |
| 6,199,013 B1 | 3/2001 | O'Shea | |
| 6,199,014 B1 | 3/2001 | Walker et al. | |
| 6,199,045 B1 | 3/2001 | Giniger et al. | |
| 6,202,022 B1 | 3/2001 | Ando | |
| 6,208,386 B1 | 3/2001 | Wilf et al. | |
| 6,208,866 B1 | 3/2001 | Rouhollahzadeh et al. | |
| 6,212,480 B1 | 4/2001 | Dunne | |
| 6,223,122 B1 | 4/2001 | Hancock et al. | |
| 6,226,636 B1 | 5/2001 | Abdel-Mottaleb et al. | |
| 6,240,424 B1 | 5/2001 | Hirata | |
| 6,240,664 B1 | 6/2001 | Hjaltason | |
| 6,252,632 B1 | 6/2001 | Cavallaro | |
| 6,253,477 B1 | 7/2001 | Balint | |
| 6,259,381 B1 | 7/2001 | Small | |
| 6,266,442 B1 | 7/2001 | Laumeyer et al. | |
| 6,266,612 B1 | 7/2001 | Dussell et al. | |
| 6,271,840 B1 | 8/2001 | Finseth et al. | |
| 6,282,362 B1 | 8/2001 | Murphy et al. | |
| 6,292,227 B1 | 9/2001 | Wilf et al. | |
| 6,292,745 B1 | 9/2001 | Robare et al. | |
| 6,317,058 B1 * | 11/2001 | Lemelson et al. | 340/910 |
| 6,321,158 B1 | 11/2001 | DeLorme et al. | |
| 6,321,161 B1 | 11/2001 | Herbst et al. | |
| 6,339,746 B1 | 1/2002 | Sugiyama et al. | |
| 6,351,708 B1 | 2/2002 | Takagi et al. | |
| 6,351,710 B1 | 2/2002 | Mays | |
| 6,353,398 B1 | 3/2002 | Amin et al. | |
| 6,356,835 B2 | 3/2002 | Hayashi et al. | |
| 6,356,837 B1 | 3/2002 | Yokota et al. | |
| 6,360,167 B1 | 3/2002 | Millington et al. | |
| 6,363,161 B2 | 3/2002 | Laumeyer et al. | |
| 6,374,182 B2 | 4/2002 | Bechtolsheim et al. | |
| 6,381,362 B1 | 4/2002 | Deshpande et al. | |
| 6,381,465 B1 | 4/2002 | Chern et al. | |
| 6,382,126 B1 | 5/2002 | Findley | |
| 6,384,471 B1 | 5/2002 | Petit et al. | |
| 6,384,871 B1 | 5/2002 | Wilf et al. | |
| 6,389,417 B1 | 5/2002 | Shin et al. | |
| 6,389,424 B1 | 5/2002 | Kim et al. | |
| 6,405,128 B1 | 6/2002 | Bechtolsheim et al. | |
| 6,405,132 B1 | 6/2002 | Breed et al. | |
| 6,407,674 B1 | 6/2002 | Gallagher | |
| 6,411,953 B1 | 6/2002 | Ganapathy et al. | |
| 6,414,602 B2 | 7/2002 | Polyakov | |
| 6,414,696 B1 | 7/2002 | Ellenby et al. | |
| 6,415,226 B1 | 7/2002 | Kozak | |
| 6,424,914 B1 | 7/2002 | Lin | |
| 6,430,499 B1 | 8/2002 | Nakano et al. | |
| 6,438,130 B1 | 8/2002 | Kagan et al. | |
| 6,438,561 B1 | 8/2002 | Israni et al. | |
| 6,442,478 B2 | 8/2002 | Hamada et al. | |
| 6,449,384 B2 | 9/2002 | Laumeyer et al. | |
| 6,452,498 B2 | 9/2002 | Stewart | |
| 6,453,056 B2 | 9/2002 | Laumeyer et al. | |
| 6,463,432 B1 | 10/2002 | Murakawa | |
| 6,466,865 B1 | 10/2002 | Petzold | |
| 6,470,267 B1 | 10/2002 | Nozaki | |
| 6,476,910 B1 | 11/2002 | Hermes | |
| 6,477,460 B2 | 11/2002 | Kepler | |
| 6,490,522 B2 | 12/2002 | Sugiyama et al. | |
| 6,498,982 B2 | 12/2002 | Bellesfield et al. | |
| 6,502,105 B1 | 12/2002 | Yan et al. | |
| 6,507,441 B1 | 1/2003 | Eisenberg et al. | |
| 6,510,379 B1 | 1/2003 | Hasegawa et al. | |
| 6,512,857 B1 | 1/2003 | Hsu et al. | |
| 6,514,594 B1 | 2/2003 | Wei et al. | |
| 6,525,768 B2 | 2/2003 | Obradovich | |

| | | | | | |
|---|---|---|---|---|---|
| 6,525,780 B1 | 2/2003 | Bruno et al. | 7,515,736 B2 | 4/2009 | Retterath et al. |
| 6,526,350 B1 | 2/2003 | Sekiyama | 7,561,959 B2 | 7/2009 | Hopkins et al. |
| 6,526,352 B1 | 2/2003 | Breed et al. | 7,577,244 B2 | 8/2009 | Taschereau |
| 6,538,751 B2 | 3/2003 | Ono | 7,590,310 B2 | 9/2009 | Retterath et al. |
| 6,539,288 B2 | 3/2003 | Ishida et al. | 7,739,044 B2 | 6/2010 | Devries et al. |
| 6,542,811 B2 | 4/2003 | Doi | 2001/0018340 A1 | 8/2001 | Tagi |
| 6,542,822 B1 | 4/2003 | Froeberg | 2001/0021011 A1 | 9/2001 | Ono |
| 6,556,917 B1 | 4/2003 | Wawra et al. | 2001/0027375 A1 | 10/2001 | Machida et al. |
| 6,558,021 B2 | 5/2003 | Wu et al. | 2001/0036293 A1 | 11/2001 | Laumeyer et al. |
| 6,563,529 B1 | 5/2003 | Jongerius | 2001/0043148 A1 | 11/2001 | Stewart |
| 6,563,959 B1 | 5/2003 | Troyanker | 2001/0043717 A1 | 11/2001 | Laumeyer et al. |
| 6,566,710 B1 | 5/2003 | Strachan et al. | 2001/0043718 A1 | 11/2001 | Laumeyer et al. |
| 6,567,103 B1 | 5/2003 | Chaudhry | 2001/0045034 A1 | 11/2001 | Mueller et al. |
| 6,567,551 B2 | 5/2003 | Shiiyama | 2002/0001032 A1 | 1/2002 | Ohki |
| 6,574,378 B1 | 6/2003 | Lim | 2002/0002552 A1 | 1/2002 | Schultz et al. |
| 6,574,616 B1 | 6/2003 | Saghir | 2002/0023010 A1 | 2/2002 | Rittmaster et al. |
| 6,575,378 B2 | 6/2003 | Aoki et al. | 2002/0032035 A1 | 3/2002 | Teshima |
| 6,577,249 B1 | 6/2003 | Akatsuka et al. | 2002/0044278 A1 | 4/2002 | Le |
| 6,577,950 B2 | 6/2003 | Shimazu | 2002/0047895 A1 | 4/2002 | Bernardo et al. |
| 6,584,221 B1 | 6/2003 | Moghaddam et al. | 2002/0059207 A1 | 5/2002 | Shimazu |
| 6,594,581 B1 | 7/2003 | Matsuda et al. | 2002/0063638 A1 | 5/2002 | Gallagher |
| 6,594,931 B1 | 7/2003 | Barton et al. | 2002/0065691 A1 | 5/2002 | Twig et al. |
| 6,604,083 B1 | 8/2003 | Bailey | 2002/0075323 A1 | 6/2002 | O'Dell |
| 6,604,398 B1 | 8/2003 | Hansen | 2002/0077749 A1 | 6/2002 | Doi |
| 6,611,628 B1 | 8/2003 | Sekiguchi et al. | 2002/0090492 A1 | 7/2002 | Haunschild et al. |
| 6,621,423 B1 | 9/2003 | Cooper et al. | 2002/0106109 A1 | 8/2002 | Retterath et al. |
| 6,622,089 B2 | 9/2003 | Hasegawa et al. | 2002/0120397 A1 | 8/2002 | Kepler |
| 6,625,315 B2 | 9/2003 | Laumeyer et al. | 2002/0120398 A1 | 8/2002 | Matsuda et al. |
| 6,653,990 B1 | 11/2003 | Lestruhaut | 2002/0128766 A1 | 9/2002 | Petzold et al. |
| 6,654,800 B1 | 11/2003 | Rieger, III | 2002/0147644 A1 | 10/2002 | Subramanian et al. |
| 6,671,615 B1 | 12/2003 | Becker et al. | 2002/0163942 A1 | 11/2002 | Baillargeon et al. |
| 6,674,878 B2 | 1/2004 | Retterath et al. | 2002/0169547 A1 | 11/2002 | Harada |
| 6,678,591 B2 | 1/2004 | Ohmura et al. | 2002/0186865 A1 | 12/2002 | Retterath et al. |
| 6,714,860 B1 | 3/2004 | Wawra et al. | 2002/0187831 A1 | 12/2002 | Arikawa et al. |
| 6,728,636 B2 | 4/2004 | Kokojima et al. | 2003/0004644 A1* | 1/2003 | Farmer ......................... 701/301 |
| 6,735,515 B2 | 5/2004 | Bechtolsheim et al. | 2003/0006911 A1 | 1/2003 | Smith et al. |
| 6,741,929 B1 | 5/2004 | Oh et al. | 2003/0013449 A1 | 1/2003 | Hose et al. |
| 6,751,549 B1 | 6/2004 | Kozak | 2003/0016869 A1 | 1/2003 | Laumeyer et al. |
| 6,766,245 B2 | 7/2004 | Padmanabhan | 2003/0023489 A1 | 1/2003 | McGuire et al. |
| 6,772,062 B2 | 8/2004 | Lasky et al. | 2003/0026268 A1 | 2/2003 | Navas |
| 6,774,908 B2 | 8/2004 | Bates et al. | 2003/0078724 A1 | 4/2003 | Kamikawa et al. |
| 6,778,224 B2 | 8/2004 | Dagtas et al. | 2003/0090415 A1 | 5/2003 | Miyasaka et al. |
| 6,778,697 B1 | 8/2004 | Shin et al. | 2003/0151664 A1 | 8/2003 | Wakimoto et al. |
| 6,785,551 B1 | 8/2004 | Richard | 2003/0158650 A1 | 8/2003 | Abe et al. |
| 6,791,492 B2 | 9/2004 | Miyasaka et al. | 2003/0174054 A1 | 9/2003 | Shimomura |
| 6,810,323 B1 | 10/2004 | Bullock et al. | 2003/0176965 A1 | 9/2003 | Padmanabhan |
| 6,820,277 B1 | 11/2004 | Eldering et al. | 2003/0182052 A1 | 9/2003 | DeLorme et al. |
| 6,836,724 B2 | 12/2004 | Becker et al. | 2003/0208315 A1 | 11/2003 | Mays |
| 6,850,269 B2 | 2/2005 | Maguire | 2003/0220736 A1 | 11/2003 | Kawasaki |
| 6,871,143 B2 | 3/2005 | Fujiara | 2004/0062442 A1 | 4/2004 | Laumeyer et al. |
| 6,885,767 B1 | 4/2005 | Howell | 2004/0070602 A1 | 4/2004 | Kobuya et al. |
| 6,888,622 B2 | 5/2005 | Shimomura | 2004/0076279 A1 | 4/2004 | Taschereau |
| 6,891,960 B2 | 5/2005 | Retterath et al. | 2004/0078814 A1* | 4/2004 | Kobuya et al. .................. 725/46 |
| 6,895,126 B2 | 5/2005 | Di Bernardo et al. | 2004/0083133 A1 | 4/2004 | Nicholas et al. |
| 6,922,630 B2 | 7/2005 | Maruyama et al. | 2004/0098175 A1 | 5/2004 | Said et al. |
| 6,952,647 B2 | 10/2005 | Hasegawa et al. | 2004/0110515 A1 | 6/2004 | Blumberg et al. |
| 6,983,203 B1 | 1/2006 | Wako | 2004/0122591 A1 | 6/2004 | MacPhail |
| 7,006,916 B2 | 2/2006 | Kawasaki | 2004/0127614 A1 | 7/2004 | Jiang et al. |
| 7,031,983 B2 | 4/2006 | Israni et al. | 2004/0156531 A1 | 8/2004 | Retterath et al. |
| 7,039,630 B2 | 5/2006 | Shimazu | 2004/0218910 A1 | 11/2004 | Chang et al. |
| 7,043,057 B2 | 5/2006 | Retterath et al. | 2004/0220730 A1 | 11/2004 | Chen et al. |
| 7,082,426 B2 | 7/2006 | Musgrove et al. | 2004/0243307 A1 | 12/2004 | Geelen |
| 7,089,264 B1 | 8/2006 | Guido et al. | 2004/0249565 A1 | 12/2004 | Park |
| 7,092,548 B2 | 8/2006 | Laumeyer et al. | 2005/0021472 A1 | 1/2005 | Gettman et al. |
| 7,092,964 B1 | 8/2006 | Dougherty et al. | 2005/0216193 A1 | 9/2005 | Dorfman et al. |
| 7,149,626 B1 | 12/2006 | Devries et al. | 2005/0249378 A1 | 11/2005 | Retterath et al. |
| 7,173,707 B2 | 2/2007 | Retterath et al. | 2005/0271304 A1 | 12/2005 | Retterath et al. |
| 7,177,761 B2 | 2/2007 | Kaufman et al. | 2006/0002590 A1 | 1/2006 | Borak |
| 7,248,966 B2 | 7/2007 | Devries et al. | 2006/0004512 A1 | 1/2006 | Herbst et al. |
| 7,266,447 B2 | 9/2007 | Bauer et al. | 2006/0004514 A1 | 1/2006 | Bennett et al. |
| 7,272,498 B2 | 9/2007 | Singh | 2006/0178822 A1 | 8/2006 | Lee |
| 7,286,931 B2 | 10/2007 | Kawasaki | 2006/0253481 A1 | 11/2006 | Guido et al. |
| 7,409,110 B2 | 8/2008 | Kayahara | 2006/0262312 A1 | 11/2006 | Retterath et al. |
| 7,411,681 B2 | 8/2008 | Retterath et al. | 2007/0043707 A1 | 2/2007 | Kulkarni et al. |
| 7,421,341 B1 | 9/2008 | Hopkins et al. | 2007/0081744 A1 | 4/2007 | Gokturk et al. |
| 7,440,003 B2 | 10/2008 | Shimamura et al. | 2007/0154067 A1 | 7/2007 | Laumeyer et al. |
| 7,444,003 B2 | 10/2008 | Laumeyer et al. | 2007/0216904 A1 | 9/2007 | Retterath et al. |
| 7,460,953 B2 | 12/2008 | Herbst et al. | 2007/0233372 A1 | 10/2007 | Matsunaga et al. |
| 7,487,041 B2 | 2/2009 | Devries et al. | 2008/0154496 A1 | 6/2008 | Bucchieri |

| | | | |
|---|---|---|---|
| 2008/0291201 | A1 | 11/2008 | Lafon |
| 2008/0291217 | A1 | 11/2008 | Vincent et al. |
| 2008/0292213 | A1 | 11/2008 | Chau |
| 2009/0037103 | A1 | 2/2009 | Herbst et al. |
| 2009/0240431 | A1 | 9/2009 | Chau et al. |
| 2009/0252376 | A1 | 10/2009 | Retterath et al. |
| 2009/0265095 | A1 | 10/2009 | Hopkins et al. |
| 2010/0082597 | A1 | 4/2010 | Retterath et al. |

FOREIGN PATENT DOCUMENTS

| | | |
|---|---|---|
| EP | 0 406 946 A1 | 9/1991 |
| EP | 0 539 144 A2 | 4/1993 |
| EP | 0 867 690 | 9/1998 |
| EP | 1 024 347 | 8/2000 |
| EP | 1 030 167 | 8/2000 |
| EP | 1 160 694 | 5/2001 |
| EP | 1 271 104 A2 | 1/2003 |
| EP | 1 349 363 | 10/2003 |
| EP | 1 305 783 | 11/2004 |
| EP | 1 614 997 A1 | 1/2006 |
| EP | 1 612 707 A2 | 4/2006 |
| JP | 11086027 | 3/1999 |
| JP | 2001148009 | 5/2001 |
| JP | 2001227865 | 8/2001 |
| JP | 2003037838 | 2/2003 |
| JP | 2003227722 | 8/2003 |
| JP | 2004062755 | 2/2004 |
| JP | 2004062756 | 2/2004 |
| WO | WO 97/09823 | 3/1997 |
| WO | WO 98/24242 | 6/1998 |
| WO | WO 99/39160 | 8/1999 |
| WO | WO 99/54848 | 10/1999 |
| WO | WO 00/49530 A1 | 8/2000 |
| WO | WO 02/27272 | 4/2002 |
| WO | WO 02/063243 A1 | 8/2002 |
| WO | WO 2004/003852 A1 | 1/2004 |
| WO | WO 2004/076978 A1 | 9/2004 |

OTHER PUBLICATIONS

Dominant Color Transform and Circular Pattern Vector for Traffic Sign Detection and Recognition, Jung Hak and Tae Young Choi, IEICE Transaction Fundamentals, vol. E81-A, No. 6, pp. 1128-1135, Jun. 1998.

A Trainable Pedestrian Detection System, C. Papageorgiou, T. Evgenious, T. Poggio, Center for Biological and Computational Learning and Artificial Intelligence Laboratory, MIT, IEEE International Conference on Intelligent Vehicles, pp. 241-246, 1998.

Robust Lane Recognition Embedded in a Real-Time Driver Assistance System, R. Risack, P. Klausmann, W. Kruger, W. Enkelmann, Fraunhofer-Institut fur Informations, Karlsruhe, Germany, IEEE International Conference on Intelligent Vehicles, pp. 35-40, 1998.

A Texture-based Object Detection and an Adaptive Model-based Classification, T. Kalinke, C. Tzomakas, W. Seelen, Institut fur Neuroinformatik, Bochum, Germany, IEEE International Conference on Intelligent Vehicles, pp. 143-148, 1998.

Internet Printout: The Road Sign Recognition System—RS², Faculty of Transportation Sciences, Prague, Czech Republic, 7 pgs., c. approximately 1999.

Internet Printout: The Chamfer System, 4 pgs., c. approximately 1999.

Real-Time Object Recognition: Hierarchical Image Matching in a Parallel Virtual Machine Environment, J. You, P. Bhattacharya, S. Hungenahally, School of Computing and Information Technology, Griffith University, Brisbane, Australia, Dept. of Computer Engineering, University of Nebraska, Lincoln, Nebraska, 3 pgs., undated. (1994).

An Architecture of Object Recognition System for Various Images Based on Multi-Agent, Keiji Yanai, Koichiro Deguchi, Dept. of Computer Science, University of ELectro-Communications, Tokyo, Japan, and Dept. of Mathematical Engineering and Information Physics, University of Tokyo, Tokyo, Japan, 4 pgs., undated. (1998).

Multi-Feature Matching Algorithm for Free-Form 3D Surface Registration, C. Schutz, T. Jost, H, Hugli, Institute for Microtechnology, Neuchatel, Switzerland, 3 pgs., undated. (Aug. 1998).

Representation of Uncertainty in Spatial Target Tracking, Tim Baker, Malcolm Strens, DERA Farnborough, United Kingdom, 4 pgs., undated. (1998).

Using Centroid Covariance in Target Recognition, Gang Liu and Robert M. Haralick, Dept. of Electrical Engineering, University of Washington, Seattle, Washington, 4 pgs., undated. (1998).

Using Spatial Sorting and Ranking in Model Based Object Recognition, G. Hjaltason, M. Ray, H. Samet, I. Weiss, Computer Science Dept. University of Maryland, College Park, Maryland, 3 pgs., undated. (Aug. 1998).

Surveillance Systems for Terrestrial Transport Safety and Improved User Information Capability, C. Nwagboso, C. Regazzoni, M. Renard, E. Stringa, Bolton Institute, Bolton, United Kingdom, Dept. of Biophysical & Electronic Engineering, Genova, Italy, Vigitec, Brussels, Belgium, pp. 1-7, undated. (1998).

Landmark Recognition using Projection Learning for Mobile Robot Navigation, Ren C. Luo, Harsh Potlapalli, Center for Robotics and Intelligent Machines, IEEE World Congress on Computational Intelligence, vol. IV, pp. 2703-2708, Jun. 1994.

A Real-Time Traffice Sign Recognition System, S. Estable, J. Schick, F. Stein, R. Janssen, R. Ott, W. Ritter, Y.-J. Zheng, Daimler-Benz Research Center, Proceedings of the Intelligent Vehicles '94 Symposium, Paris, France, pp. 213-218, Oct. 1994.

Recognition of Traffic Signs by Artificial Neural Network, D. Ghica, S. Lu, X. Yuan, Dept. of Computer Science Memorial University of Newfoundland, IEEE, pp. 1444-1449, Mar. 1995.

Realtime Traffic Sign Recognition (TSR), Jens Logemann, Ed., Univeritat Koblenz-Landau, 3 pgs., Nov. 1997.

Registering Multiple Cartographic Models with the Hierarchical Mixture of Experts Algorithm, Simon Moss and Edwin R. Hancock, Dept. of Computer Science, University of New York, IEEE, pp. 909-914, 1997.

Multi-Modal Tracking of Faces for Video Communications, James L. Crowley and Francois Berard, GRAVIR—IMAG, I.N.P. Grenoble, Grenoble, France, IEEE, pp. 640-645, 1997.

Road Traffic Sign Detection and Classification, A. Escalera, L. Moreno, M. Salichs, J. Armingol, IEEE Transactions on Industrial Electronics, vol. 44, No. 6, pp. 848-859, Dec. 1997.

Mandal, "Illumination Invariant Image Indexing Using Moments and Wavelets" Journal of Electronic Imaging, Apr. 1998 pp. 282-293, vol. 7 (2), USA.

Celentano, "Feature Integration and Relevance Feedback Analysis in Image Similarity Evaluation" Journal of Electronic Imaging, Apr. 1998, pp. 308-317 vol. 7(2), USA.

Estevez, Auto-Associative Segmentation for Real-Time Object Recognition in Realistic Outdoor Images, Journal of Electronic Imaging, Apr. 1998 pp. 378-385 vol. 7(2), USA.

J Patrick Bixler, Department of Computer Science, Virginia Tech, Blacksburg, Virginia; David P. Miller Artificial Intelligence Group, Jet Propulsion Laboratory, California Institute of Technology, Pasadena, California, "Extracting text from real-world scenes", Article, 8 pp., 1988.

Carson et al., "Region Base Image Querying," Proc. of IEEE CUPR Workshop on Content-Based Access of Images and Video Libraries, 1997.

Lui et al., "Scalable Object-Based Image Retrieval," a pdf paper, Sep. 2003.

Ozer et al., "A Graph Based Object Description for Information Retrieval in Digital Image and Video Libraries," a pdf paper, 1998.

Fan et al., "Automatic Model-Based Semantic Object Extraction Algorithm," IEEE Trans on Circuits and Systems for Video Technology, vol. 11, No. 10, Oct. 2001, pp. 1073.

Ardizzoni et al., "Windsurf: Region Based Image Retrieval Using Wavelets," Proc. of the 1st Int'l Workshop on Similarity Search, Sep. 1999, pp. 167-173.

Application and File History for U.S. Appl. No. 11/122,969, filed May 5, 2005, now U.S. Patent No. 7,590,310, Inventors Retterath et al.

Application and File History for U.S. Appl. No. 10/634,630, filed Aug. 5, 2003, now U.S. Patent No. 7,092,548, Inventors Laumeyer et al.

Application and File History for U.S. Appl. No. 11/457,255, filed Jul. 13, 2006, now U.S. Patent No. 7,444,003, Inventors Laumeyer et al.

Application and File History for U.S. Appl. No. 09/928,218, filed Aug. 10, 2001, now U.S. Patent No. 6,891,960, Inventors Retterath et al.

Application and File History for U.S. Appl. No. 11/056,926, filed Feb. 11, 2005, now U.S. Patent No. 7,515,736, Inventors Retterath et al.

Application and File History for U.S. Appl. No. 12/419,843, filed Apr. 7, 2009, Inventors Retterath et al.

Application and File History for U.S. Appl. No. 09/918,375, filed Jul. 30, 2001, now U.S. Patent No. 6,674,878, Inventors Retterath et al.

Application and File History for U.S. Appl. No. 10/736,454, filed Dec. 15, 2003, now U.S. Patent No. 7,043,057, Inventors Retterath et al.

Application and File History for U.S. Appl. No. 11/381,503, filed May 3, 2006, now U.S. Patent No. 7,173,707, Inventors Retterath et al.

Application and File History for U.S. Appl. No. 11/702,421, filed Feb. 5, 2007, now U.S. Patent No. 7,411,681, Inventors Retterath et al.

Application and File History for U.S. Appl. No. 12/584,894, filed Sep. 14, 2009, Inventors Retterath et al.

Application and File History for U.S. Appl. No. 11/382,170, filed May 8, 2006, now U.S. Patent No. 7,451,041, Inventors Laumeyer et al.

Google Information-Google Milestones, http://www.google.com/corporate/history.html, p. 13, lines 4-5, Apr. 23, 2010.

* cited by examiner

Figure 4 Image N+1

Figure 5 - Image N+2

Figure 6 - Image N+3

Figure 7. Sign Polygon Definitions for Full Sign

Figure 8 Sign Polygon Definitions for Partial Sign

NETWORK-BASED NAVIGATION SYSTEM HAVING VIRTUAL DRIVE-THRU ADVERTISEMENTS INTEGRATED WITH ACTUAL IMAGERY FROM ALONG A PHYSICAL ROUTE

PRIORITY APPLICATION

This application is a continuation of U.S. patent application Ser. No. 11/382,170, filed May 8, 2006, now U.S. Pat. No. 7,451,041, which claims priority to U.S. Provisional Patent Application No. 60/678,847, filed May 6, 2005, of the same title, the disclosure of which is hereby incorporated by reference in its entirety.

BACKGROUND OF THE INVENTION

1. Field of the Invention

This invention generally relates to data processing systems for vehicles, navigation and relative location. More specifically, the present invention is directed to a network-based navigation system for use with a map database system that provides visual route guidance information having virtual drive-thru advertisements integrated with actual imagery from along a physical route.

2. Background Art

Computerized route guidance and navigation systems are well known in the art. In-vehicle navigation systems, for example, rely on global positioning satellite (GPS) technology to provide current positional information of a vehicle that is used to control the display of route specific geographic or cartographic information maintained in a map database carried by the vehicle. In contrast, Internet-based navigation and mapping services like MapQuest®, Google Maps, Yahoo! Maps and Microsoft MapPoint® rely on a user request for information about a particular route or destination, instead of GPS data, and then use this information to access various online map databases in order to provide the user with maps and travel instructions over the Internet.

While most in-vehicle navigation systems display the position of the vehicle or the desired route on conventional cartographic map displays, some in-vehicle navigation systems have been designed to provide additional information beyond the conventional in-vehicle map display. For example, U.S. Pat. No. 5,115,398 describes an in-vehicle navigation system in which the navigation data is used to superimpose an indication signal on a real-time image of the roadway generated by a forward-looking video image pick-up unit in the vehicle. U.S. Pat. No. 5,982,298 describes an in-vehicle navigation system with a user interface that integrates highway-monitoring video with maps information. U.S. Pat. No. 6,525,768 describes a similar arrangement utilizing a personal digital assistant, instead of a completely in-vehicle based system. Similar kinds of additional information have also been integrated into Internet-based navigation systems, as shown for example, in U.S. Pat. Nos. 6,477,460 and 6,498,982.

Navigation systems have been developed that correlate aerial perspectives of a route (either actual or virtual) with map-based information in order to provide the equivalent of a bird's-eye view flyover of the route. U.S. Pat. No. 6,653,990 describes an in-vehicle version of this approach. U.S. Publication Nos. 2004/0218910A1 and 2002/0059207A1 describe Internet-based versions of this approach.

Navigation systems have also attempted to integrate driver perspectives of a route (either actual or virtual) with map-based information in order to provide the equivalent of a first-person drive-thru of the route. U.S. Pat. No. 4,937,950 describes an early attempt to incorporate a three-dimensional presentation of an in-vehicle map-based navigation route. U.S. Pat. No. 5,613,055 describes the use of driver-point-of-view generated animation of a navigation route. U.S. Pat. Nos. 6,199,014 and 6,351,710 describe the use of driver-point-of-view photographs for an Internet-based navigation system, while U.S. Pat. No. 6,182,011 describes the same approach used in an in-vehicle navigation system. PCT Publication No. WO 99/39160A1 describes the use of first person-perspective video clips of a route to be navigated, such as displayed on a handheld device. Various techniques for acquiring video and photographic images of a physical roadway from a driver-perspective are described in U.S. Pat. Nos. 5,633,946, 6,449,384, 6,453,056, and 6,526,352, including the recognition of road signs along the roadway.

In-vehicle navigation systems have been developed that make use of information alongside or near a roadway as part of the navigation system, as described, for example, in U.S. Pat. Nos. 6,671,615 and 6,836,724. Other in-vehicle systems as described in U.S. Pat. Nos. 5,664,948, 5,627,549, 6,542,822 and 6,714,860, and U.S. Publication No. 2003/0006911 A1, for example, have been developed to present information about road signs and other forms of advertisements to the occupants of a vehicle as the vehicle passes the vicinity of the road sign or advertisement. One in-vehicle navigation system that provides augmented information in a video display of the current route is described in U.S. Pat. No. 6,604,398.

Even though in-vehicle navigation systems have made use of additional information from road signs and advertisements to augment or supplement the actual experience as a vehicle is traveling along a roadway, there have been very few similar approaches developed for other types of applications. One application where there has been the selective replacement of video images, and particularly billboard advertising images, has been in the context of broadcasting sporting events. U.S. Pat. Nos. 6,208,386, 6,292,227 and 6,384,471 describe various techniques for processing video streams acquired by stationary cameras in order to effectively replace actual billboards in a stadium with prerecorded or computer generated advertising images. The techniques for selective replacement of a portion of a video image acquired by a stationary camera are generally well known as described, for example, in U.S. Pat. Nos. 5,353,392, 5,491,517, 6,252,632, 6,381,362, 6,525,780, 6,774,908 and 6,778,224 and PCT Publication No. WO 98/24242A1. While these techniques are well developed with respect to the changing fields of view for a stationary camera, these techniques generally have not been applied in the context of actual imagery captured by a moving camera traversing along a physical roadway.

It would be desirable to provide a network-based navigation system for use with a map database system that improved upon the current approaches for using actual imagery from along a physical route in conjunction with the navigation instructions for a given route.

SUMMARY OF THE INVENTION

The present invention is a network-based navigation system having a user interface and a computer server system that can access a map database, an actual imagery database and an advertisement database in order to provide visual route guidance information having virtual drive-thru advertisements integrated with actual imagery from along a physical route. The user interface permits a user to submit a request for navigation information, receive visual route guidance information in response to the request and initiate a drive-thru presentation of at least a portion of the route. The computer server determines at least one route from the map database based on the request from the user and provides route guidance information to the user interface in response. The computer server also identifies actual imagery from the image database associated with the at least one route and selectively replaces at least one polygon region identified in the actual imagery associated with the at least one route with at least one advertisement from the ad database to create a drive-thru presentation with at least one virtual advertisement. In one embodiment, at least a portion of the drive-thru presentation is presented to the user interface and the computer server records a drive-thru charge for the virtual advertisements present in the portion of the drive-thru presentation provided to the user interface.

In practice, the vehicle acquiring the video imagery is equipped with a sufficient number of cameras mounted on the vehicle which after post-processing preferably provide a 360 degree field of view around the location of the vehicle at any given instant of time. The image frames are tagged with absolute and/or relative geo-spatial coordinates. When a user requests a virtual drive through of a particular route, the images corresponding to the geographical coordinates of points on the route are retrieved and replayed with original, replaced or synthetic drive-thru advertisements.

All the advertisements along the route are flagged as visited by the user as a "drive thru" are played on the user interface. In one embodiment, the "drive thru" provides a metric of the eyeballs that were exposed to the advertisement and therefore a first rate billed to the advertiser associated with each advertisement. Alternatively, the user may "stop" along the route during a drive-thru and click on a particular advertisement to be hyperlinked to the advertiser's website. The "click thru" is recorded and provides a metric of the eyeballs attracted to a particular advertisement and therefore of a second rate billed to the advertiser for the click thru, as opposed to the drive thru.

The following figures are not drawn to scale and only detail a few representative embodiments of the present invention, more embodiments and equivalents of the representative embodiments depicted herein are easily ascertainable by persons of skill in the art.

DETAILED DESCRIPTION OF THE PREFERRED EMBODIMENTS

Figure 1:
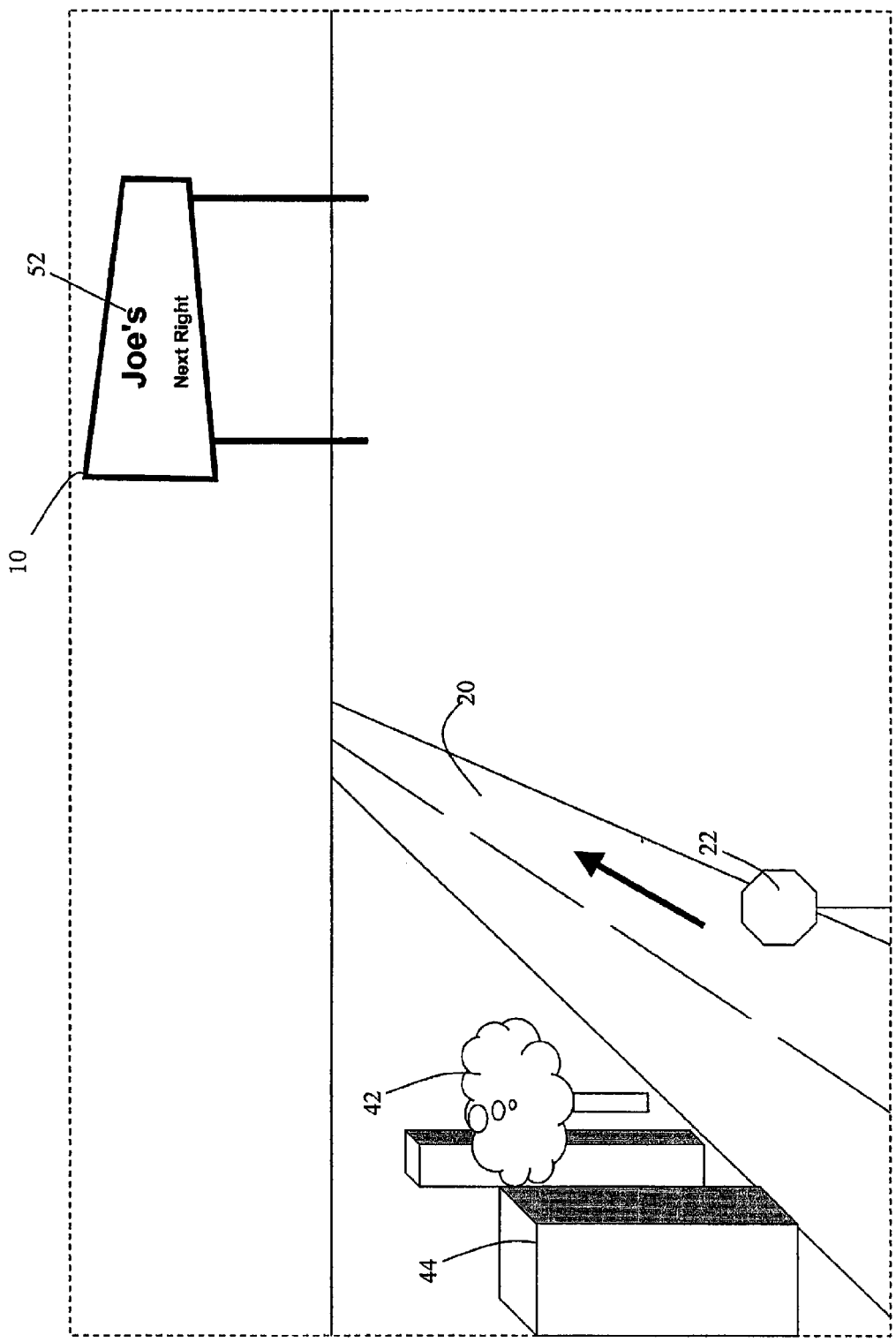
FIG. 1 is a perspective view of illustrating an image of an exemplary roadway environment containing different objects of interest in accordance with the present invention.

Referring to FIG. 1, there is represented schematically a roadway 20. The roadway 20 has disposed on either side and in front of it, road sign 22, an advertisement sign 10, interspersed along with natural landmark 42 and manmade landmark 44. Advertisement sign 10 has a first advertisement 52 displayed on the sign.

A data acquisition vehicle (not shown) is driven along the roadway 20 and is equipped with an image acquisition system. According to an embodiment of the present invention, the image acquisition system preferably comprises six cameras positioned above roadway 20. Two cameras may be disposed on the right and the left side of the front of vehicle respectively, cameras may also be disposed on the right and the left side of the rear of vehicle respectively, and cameras may desirably be disposed on the right and the left side of the vehicle respectively. In particular, other than views of the objects and scenery on the roadway ahead and behind the vehicle on the roadway, objects and scenery in the lateral view of the vehicle are also acquired. The cameras may be positioned inside of the vehicle and directed to the outside through the windshield for example.

One of skill in the art will recognize that other configurations of the cameras may be utilized within the scope of the present invention. In particular, the configuration used may be the one disclosed in U.S. Pat. No. 6,453,056, entitled "Method and Apparatus for Generating a Database of Road Sign Images and Positions", the disclosure of which is incorporated herein in its entirety. The objective of the image acquisition system is to obtain images, either moving or still, digital or photographic, that can be processed into a visual imagery database containing images of the roadway 20 from a driver's perspective, the driver's perspective being generally horizontally oriented and having a field of vision that extends generally laterally from the front, back or sides of the image acquisition vehicle. In a general embodiment of the present invention, the complete imagery generating passes generate imagery corresponding to a 360 degree field of view at each point or the imagery can be composed into a virtual 360 degree view at any point along the roadway after the images have been compiled/processed. The camera system disclosed above takes images of physical scenes and objects along a roadway. The cameras are operably coupled to a computer processor and a database (not shown) as by electrical or fiber optic cables. The processing equipment may be local or remote.

The sequence of images are processed to generate image frames tagged with meta data such as the location of the vehicle, the orientation and identity of the camera, the speed of the vehicle, the environmental conditions, the time and date of image acquisition and other data of interest. The image processing system detects objects in the image stream and categorizes them into at least one or more of road signs, advertising signs, natural objects, and manmade landmarks. The image-processing unit also extracts other information from the image stream from each camera such as, for example, the distances between the vehicle and the signs/landmarks in the image stream, the three-dimensional configuration of the roadway, and other data that may be of interest. Additionally, each image frame may be augmented with meta data such as positional data locating the vehicle on a computerized map. This is achieved, for example, by coupling the system to a GPS system or by utilizing cell phone tower triangulation or other similar position referencing techniques. A preferred embodiment of the methods, apparatus and systems utilized by the present invention are disclosed in U.S. Pat. No. 6,449,384, entitled "Method and Apparatus for Rapidly Determining Whether a Digitized Image Frame Contains an Object of Interest," which is incorporated herewith in its entirety. One of skill in the art will recognize that the real-time images, such as for example, video imagery, may be viewed, processed, analyzed or stored in any number of known processes, techniques and systems.

An effective method for gathering ground-based geo-referenced imagery is practiced by attaching digital cameras and a positioning system to a vehicle and operating the vehicle over roadways. As the vehicle traverses the roadways, the cameras periodically capture images that are tagged with positional information. Multiple cameras are typically used in order to provide a rich user experience with the gathered imagery. All geo-referenced images can be uniquely identified by their run ID, camera number, and image number. The run ID refers to a grouping of images collected by a specific vehicle on a given date. Each image "run" will typically start with image number 0 and continue with sequentially numbered images throughout the run. Each camera on a vehicle will produce sequentially numbered images for a given run. The image frame data depict roadside scenes as recorded from a vehicle navigating the road. These scenes will generally contain information about signage and landmarks that may be mined to characterize the signage and landmarks by type, location, orientation, and condition.

Figure 2:
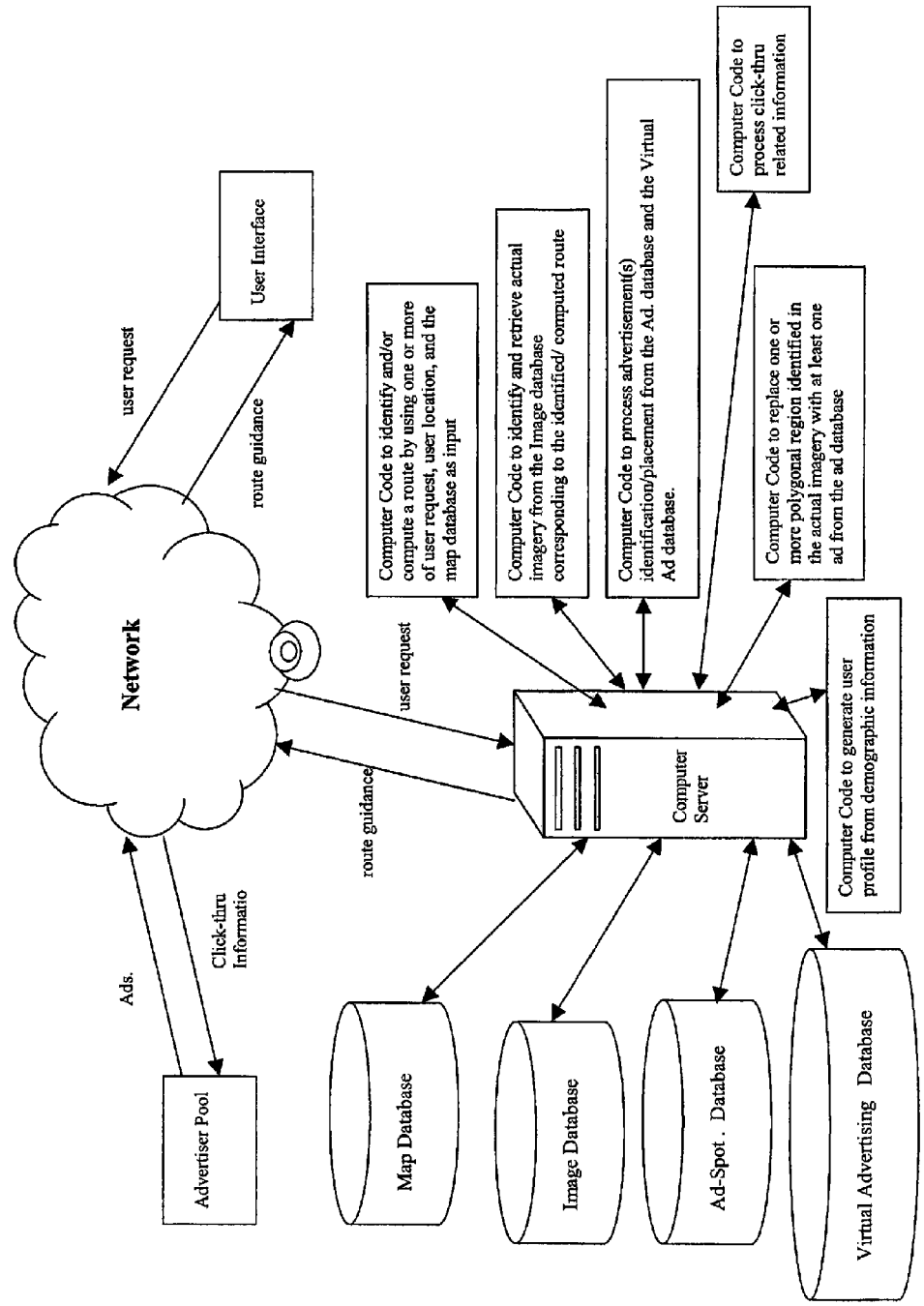
FIG. 2 is a schematic diagram of the network-based navigation system having virtual drive-thru advertisements integrated with actual imagery from along a physical route
Figure 3:
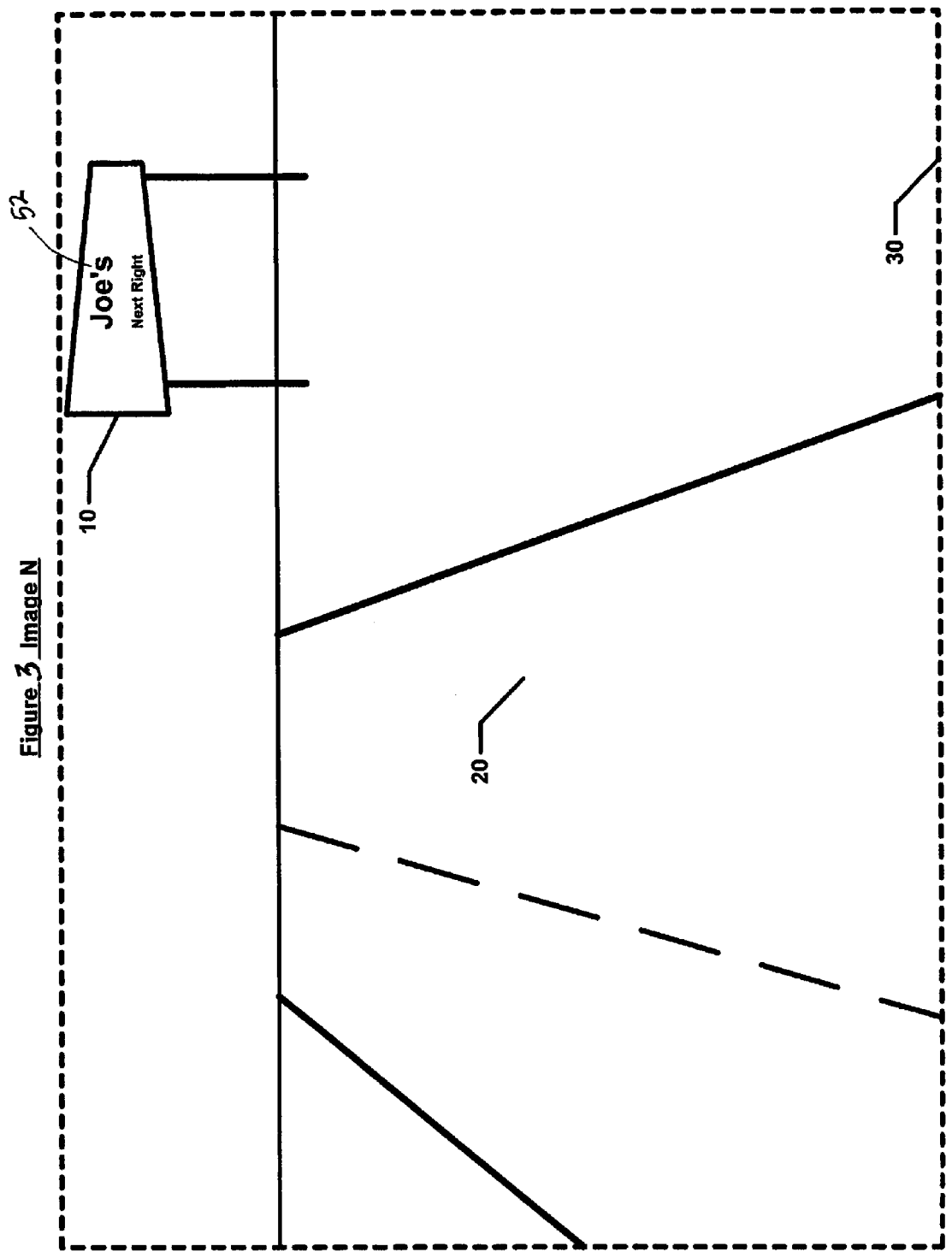
FIG. 3 shows a representation of a geo-referenced image N that contains a sign.
Figure 4:
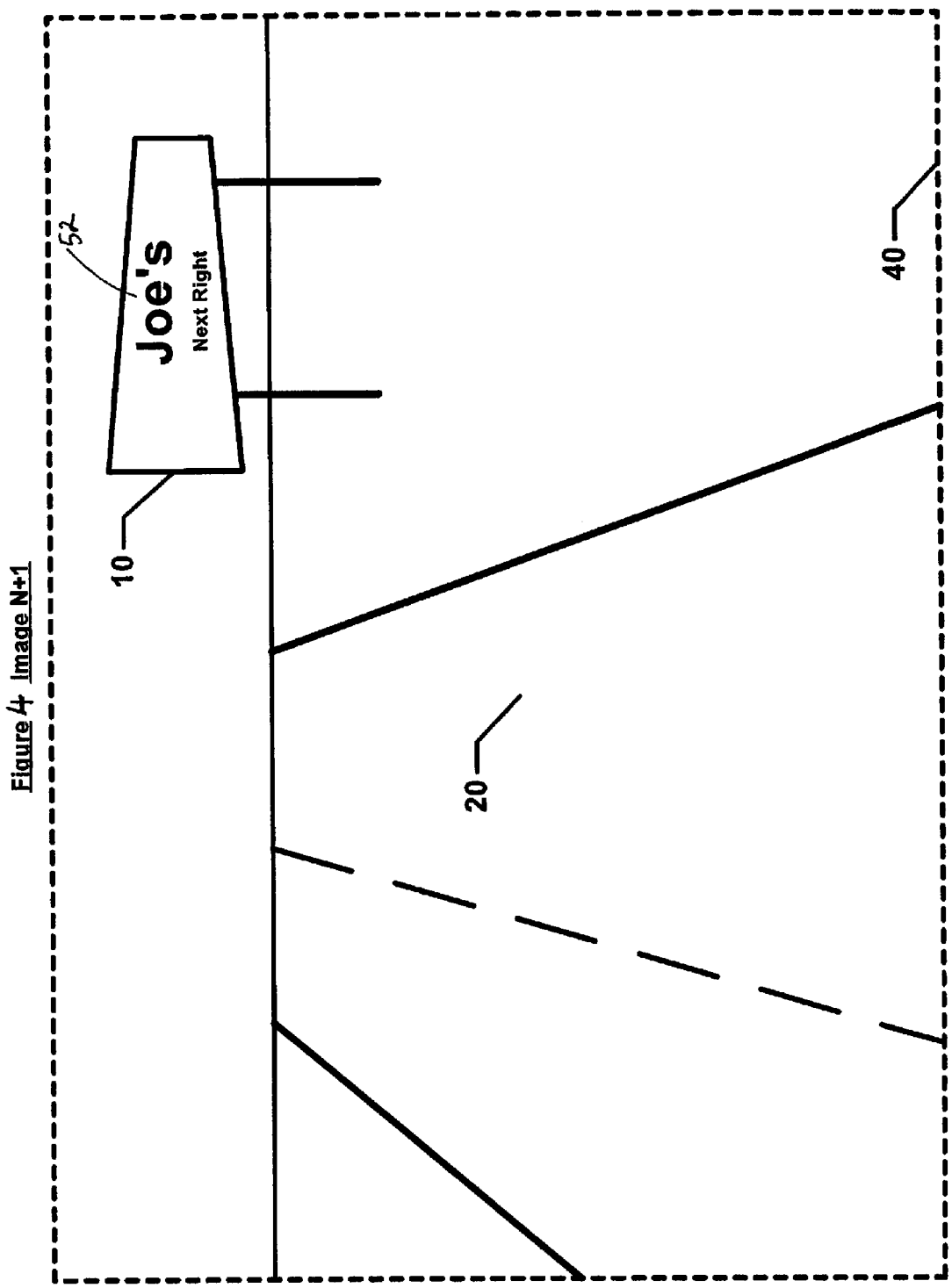
FIG. 4 shows a representation of a geo-referenced image N+1 that contains a sign.
Figure 5:
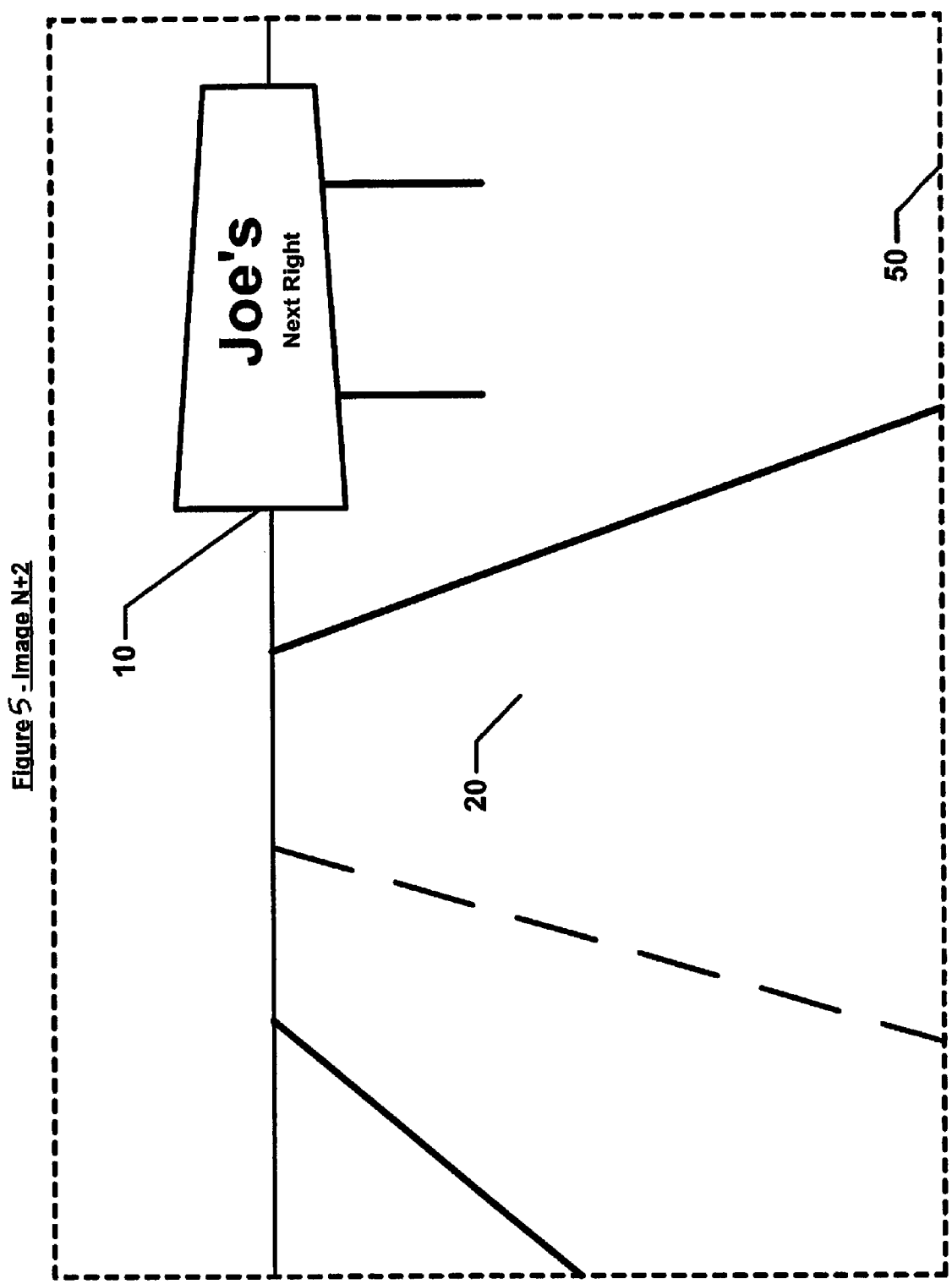
FIG. 5 shows a representation of a geo-referenced image N+2 that contains a sign.
Figure 6:
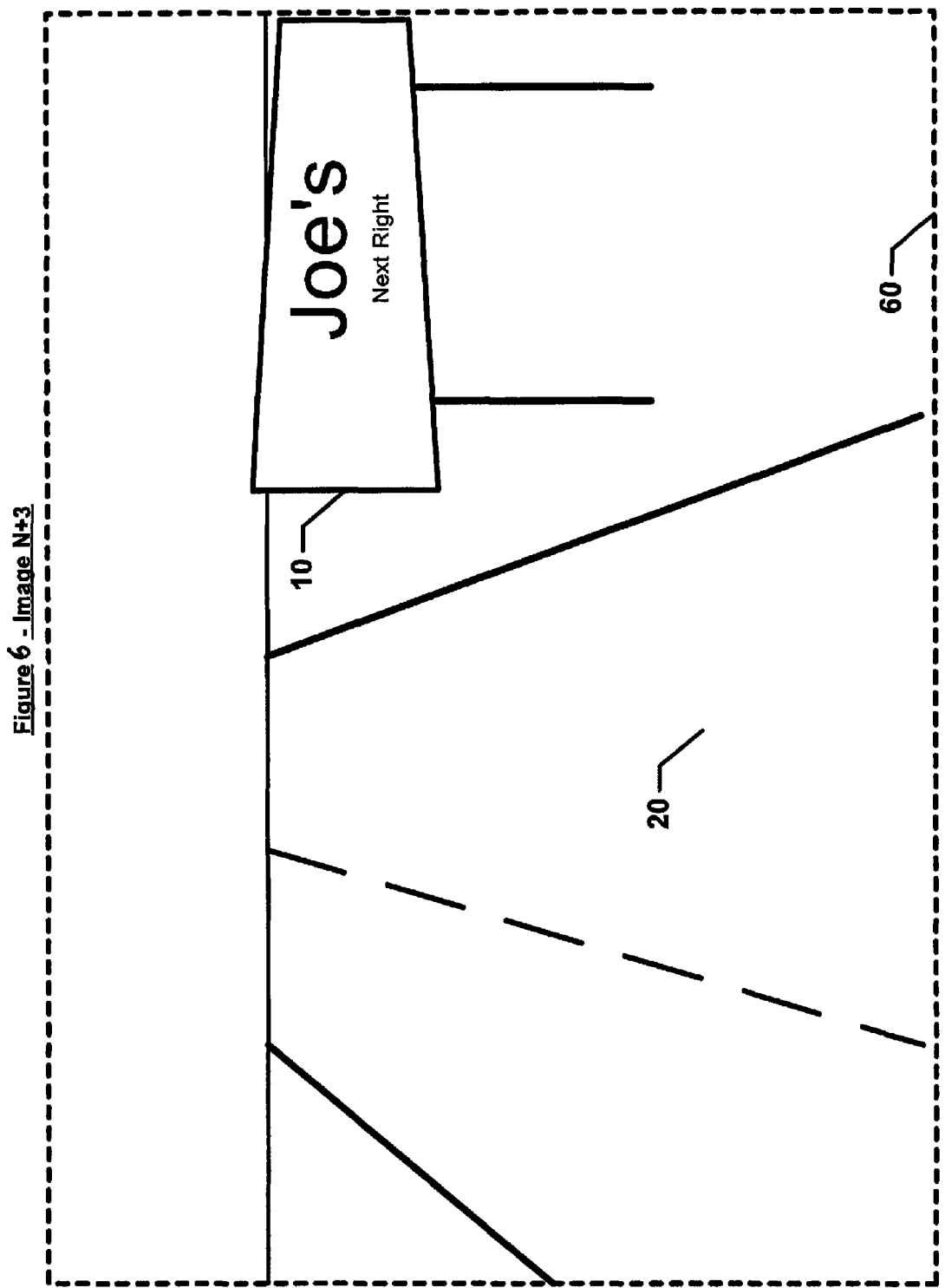
FIG. 6 shows a representation of a geo-referenced image N+3 that contains a sign.

FIG. 2 depicts an information flow diagram illustrating the processing of the image streams and/or image frames in a general embodiment of the present invention. A preferred embodiment of a method and apparatus for processing the objects is described in U.S. Pat. No. 6,363,161, entitled "System for Automatically Generating Database of Objects of Interest by Analysis of Images Recorded by Moving Vehicle," which is incorporated herewith in its entirety.

In one embodiment, the present invention allows for the identification of ad-spots within geo-referenced imagery by utilizing differentiable characteristics of the portions of the image frame that depict a road sign, ad-spots, and other manmade and natural features. These differentiable characteristics are stored as highly compressed bitmapped files each linked to a discrete data structure containing, but not necessarily limited to, one or more of the following memory fields: sign/landmark type, relative or absolute location of each sign/landmark, reference value for the recording camera, reference value for original recorded frame number for the bitmap of each recognized sign. Locations may be determined from a single image by determining depth information from shading or size estimation. Alternatively, the position may be determined by mathematical methods such as triangulation. Cameras may be calibrated in the factory or may be estimated "in the field" by a variety of well-known techniques. Alternatively, distance-ranging equipment such as a laser can yield an accurate measurement of distance. In other embodiments, locations may be determined or derived from analysis of multiple images using any one or more of these techniques.

Output signal sets resulting from application of the present method to a segment of image frames can include a compendium of data about each sign/landmark and bitmap records of each sign/landmark as recorded by a camera. Thus, records are created for image-portions that possess (and exhibit) detectable unique differentiable characteristics versus the majority of other image portions of a digitized image frame.

In the exemplary sign-finding embodiment herein these differentiable characteristics are coined "sign-ness." Based on the differentiable characteristics, or sign-ness, information regarding the type, classification, condition (linked bitmap image portion) and/or location of road signs (and image-portions depicting the road signs) are rapidly extracted from image frames. Those image frames that do not contain an appreciable level of sign-ness are categorized as background scenery. The image frames that contain an appreciable level of sign-ness are further processed and separated into two categories—road signs and potential advertisements.

After the image stream has been processed, it is in effect decomposed into component regions broadly classified according to the objects encountered within. In one embodiment, the present invention utilizes several broad categories exemplified in FIG. 1—road signs 22, advertisement signs 10, natural landmarks 42, manmade landmarks 44 and pavement 20. Other broader generalizations or narrow categories may be employed without digressing from the scope of the invention disclosed herein. Each shape is identified at least in regard to its attributes such as shape, color, and orientation with respect to each of the cameras that imaged the object, absolute location, relative location, relation with respect to the pavement. Each of these attributes may be time dependent due to the travel speed of the vehicle. Database of advertising signs may include billboards, storefronts, bus stops, kiosks, signage as well as the typical road signs that warn, inform or direct. A template database used to detect the presence of road signs in a video stream may be augmented with additional templates corresponding to each of the above advertisement signs. Alternately, image recognition or other well-known methodologies may be utilized to decipher the contents of non-road sign objects so as to classify them into advertisement and non-advertisement related categories.

In one embodiment, the present invention transforms frames of a digital image stream depicting roadside scenes using a set of filters that are logically combined together with OR gates or combined algorithmically and each output is equally weighted, and that each operate quickly to capture a differentiable characteristic of one or more signs/landmarks of interest. The image frames are typically coded to correspond to a camera number (if multiple cameras are used) and camera location data (i.e., absolute location via GPS or inertial coordinates if INS is coupled to the camera of the camera-carrying vehicle). If the location data comprises a time/position database directly related to frame number (and camera information in a multi-camera imaging system) extremely precise location information is preferably derived using triangulation of at least two of the related "images" of a confirmed object (road sign).

In one embodiment, the present invention handles partially obscured signs, skewed signs, poorly illuminated signs, signs only partially present in an image frame, bent signs, and ignores all other information present in the stream of digital frame data (preferably even the posts that support the signs). Cataloging the location, direction the camera is facing, condition, orientation, and other attributes of objects such as advertisement, road signs and landmarks to assist navigation of vehicles can be successfully completed by implementing the inventive method described herein upon a series of images of said objects. In a general embodiment, the present invention can quickly and accurately distill arbitrary/artificial objects disposed in natural settings and except for confirming at least one characteristic of the object (e.g., color, linear shape, aspect ratio, etc.), the invention operates successfully without benefit of preexisting knowledge about the full shape, actual condition, or precise color of the actual object.

The image frames that contain an appreciable level of sign-ness and categorized as potential advertisements are further processed to identify the region of the image covered by the advertisement. Each region categorized as an advertisement is assigned a unique identifier the first time it is encountered in a video stream. Typically, the specific region will persist, albeit at different orientations, in a succession of frames corresponding to a travel-rate of the camera(s) along a specific route. All the frames that contain the region correspond to one unit of advertisement space or an ad-spot in the database. The ad-spots will be identified within all images so the placement of the original ads can be tracked. All ad-spots that display the same physical ad-spot will be indexed together in the ad-spot database. Metrics that can be determined for each ad-spot include, but are not limited to, frequency of a message, frequency of an advertiser, number of frames that contain the same physical ad-spot, relative size of the ad-spot compared to the image size, type of road from which the ad-spot appears, density of traffic on the selected roadway, etc. These ad-spots are available for leasing by advertisers. An existing advertisement can be left as-is, replaced by an alternate advertisement or by background scenery to effectively erase the advertisement space from the frames. In an alternate embodiment, the images may be replaced with synthetic data. Images of real-world scenes may have objects removed in order to improve the viewing experience. In addition, the images, at the user request, can be altered to fit the current lighting and weather conditions.

FIG. 2 schematically illustrates the operative principles governing image acquisition in a first embodiment of the instant invention, which includes acquiring, processing and storing a series of images along a typical route traversed by the vehicle. Notably, the image sequences along a particular roadway are related in that they are images of the physical scenery associated with a particular roadway, acquired by a known camera configuration, by a vehicle traveling along the roadway under a particular set of environmental conditions, and at a specified rate of speed.

The present invention may be implemented in a single microprocessor apparatus, within a single computer having multiple processors, among several locally-networked processors (i.e., an intranet), or via a global network of processors (i.e., the Internet and similar). Portions of individual image frames exhibiting an appreciable level of pre-selected differentiable characteristics of desired objects are extracted from a sequence of image frame data and portions of the individual frames (and correlating data thereto) are used to confirm that a set of several "images" in fact represent a single "object" of a class of objects. These pre-selected differentiable characteristic criteria are chosen from among a wide variety of detectable characteristics including color characteristics (color-pairs and color set memberships), edge characteristics, symmetry, convexity, lack of 3D volume, number and orientation of side edges, characteristic corner angles, frequency, and texture characteristics displayed by the 2-dimensional (2D) images so that said objects can be rapidly and accurately recognized. In one embodiment, the differentiable characteristics are chosen with regard to anticipated camera direction relative to anticipated object orientation so that needless processing overhead is avoided in attempting to extract features and characteristics likely not present in a given image frame set from a known camera orientation. Similarly, in the event that a scanning recording device, or devices, are utilized to record objects populating a landscape, area, or other space the extraction devices can be preferably applied only to those frames that likely will exhibit appreciable levels of an extracted feature or characteristic.

In one embodiment, the inventive system taught herein is applied to image frames and an output signal set of location, type, condition, and classification of each identified sign/landmark is produced and linked to at least one bitmap image of the sign/landmark. The output signal set and bitmap record(s) are thus available for later scrutiny, evaluation, processing, and archiving. Of course, pre-filtering or conditioning the image frames may increase the viability of practicing the present invention. Some examples include color calibration, color density considerations, video filtering during image capture, etc.

The envisioned system can be built for entire geographic entities from cities to countries to the entire planet. Due to the enormity of the data size and the need for rapid geospatial queries, the indexing can be geospatially based. The geospatial indexing also allows for ease of updating of the system by multiple traversals of a location regardless if they are years apart in time. The resulting symmetric decrease in storage size is also a strong feature of the geospatial representation method.

Viewpoint and viewing angle are best represented by the geospatial indexing process as the computations are then reduced to simple trigonometry versus complex database queries. This method of storage eliminates any difficulties with occluded or bent objects as their "true" extents can be represented even if not visible from the imagery.

The present invention may be practiced with imaging systems ranging from monochromatic visible wavelength camera/film combinations to full color spectrum visible wavelength camera/memory combinations to ultraviolet, near infrared, or infrared imaging systems, so long as basic criteria are present: object differentiability from its immediate milieu or range data.

Image frames that are temporally related—i.e. taken at or about a particular instant of time t1—may be "stitched" together to obtain a composite image of the environment surrounding the vehicle at the instant of time. Successive composite images representing progression of the vehicle along the roadway, can be further processed to obtain a composite real-time video of the scene unfolding as would appear to a driver of the vehicle viewing the roadway along a specified driver's line-of-sight from within the vehicle. Those of ordinary skill in the art of machine vision and image processing will recognize that there are numerous schemes for performing such transformations.

For example, U.S. Pat. No. 5,649,032, which is incorporated herein by reference, discloses methods for automatically generating a mosaic from a sequence of images. The invention can construct both, dynamic (i.e. changing over time) and static (no change with time) mosaics. U.S. Pat. No. 6,512,857, which is incorporated herein by reference, discloses a system and method for accurately mapping between camera-coordinates and geo-coordinates, called geo-spatial registration. The method utilizes the imagery and terrain information contained in the geo-spatial database to precisely align the reference imagery with input imagery, such as dynamically generated video images or video mosaics, and thus achieves a high accuracy identification of locations within the scene. The geo-spatial reference database generally contains a substantial amount of reference imagery as well as scene annotation information and object identification information. When a sensor, such as a video camera, images a scene contained in the geo-spatial database, the system recalls a reference image pertaining to the imaged scene. This reference image is aligned very accurately with the sensor's images using a parametric transformation. Thereafter, other information that is associated with the reference image can easily be overlaid upon or otherwise associated with the sensor imagery.

A specific embodiment of the present invention is illustrated in FIGS. 3, 4, 5, 6, and 7 which shows four consecutive geo-referenced images gathered from a roadway. A sign 10 next to the actual roadway 20 appears in all four views 30, 40, 50, and 60. As described below, there is created a database model that describes the locations of these sign views 30, 40, 50, 60 in a way that will allow the tracking and replacement of the sign 10 with another advertisement.

Figure 7:
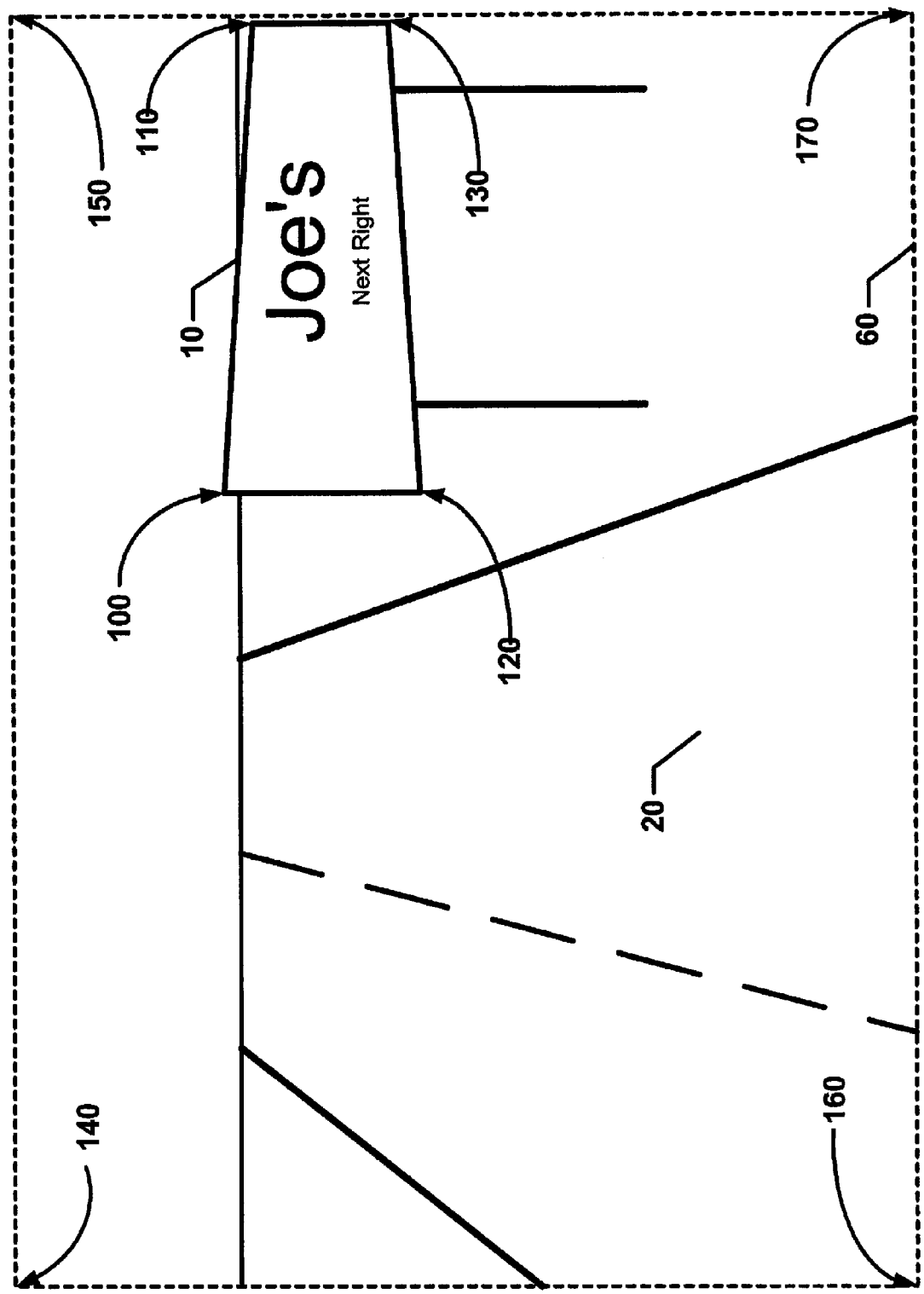
FIG. 7 shows the definitions of the image bounding box and the sign border polygon for a sign completely within the camera's field of view.

FIG. 7 shows the locations of the four points of the sign border polygon: $x_0,y_0$ 100; $x_1,y_1$ 110; $x_2,y_2$ 120; $x_3,y_3$ 130. If it is assumed that the sign is only seen from the four views 30, 40, 50, 60 shown, the database model for the sign 10 will be as shown in Table 1 below:

TABLE 1

| Sign | Run | Cam. | Image# | $S_0$ | $S_1$ | $S_2$ | $S_3$ |
|---|---|---|---|---|---|---|---|
| M | K | 0 | N | $x_0, y_0$ | $x_1, y_1$ | $x_2, y_2$ | $x_3, y_3$ |
| M | K | 0 | N + 1 | $x_0, y_0$ | $x_1, y_1$ | $x_2, y_2$ | $x_3, y_3$ |
| M | K | 0 | N + 2 | $x_0, y_0$ | $x_1, y_1$ | $x_2, y_2$ | $x_3, y_3$ |
| M | K | 0 | N + 3 | $x_0, y_0$ | $x_1, y_1$ | $x_2, y_2$ | $x_3, y_3$ |

Each row in the database corresponds to a distinct image 30, 40, 50, and 60 that contains the ad-spot. $S_0$ through $S_3$ define the corner points for the four-sided polygon that makes up the ad-spot border. Each image 30, 40, 50, 60 will have a unique $S_0$ through $S_3$ 100, 110, 120, 130 since the ad-spot will inhabit a different location within each frame.

For more complete user experiences, image collection vehicles will typically implement multiple cameras as has been noted above. If the vehicle in the example above has a second camera aimed to the right of the forward-facing camera, the sign will possibly be seen in one or more images captured with this second camera. With the second camera, the ad-spot database for this sign would be as shown in Table 2 below:

TABLE 2

| Sign | Run | Cam. | Image# | $S_0$ | $S_1$ | $S_2$ | $S_3$ |
|---|---|---|---|---|---|---|---|
| M | K | 0 | N | $x_0, y_0$ | $x_1, y_1$ | $x_2, y_2$ | $x_3, y_3$ |
| M | K | 0 | N + 1 | $x_0, y_0$ | $x_1, y_1$ | $x_2, y_2$ | $x_3, y_3$ |
| M | K | 0 | N + 2 | $x_0, y_0$ | $x_1, y_1$ | $x_2, y_2$ | $x_3, y_3$ |
| M | K | 0 | N + 3 | $x_0, y_0$ | $x_1, y_1$ | $x_2, y_2$ | $x_3, y_3$ |
| M | K | 1 | N + 3 | $x_0, y_0$ | $x_1, y_1$ | $x_2, y_2$ | $x_3, y_3$ |
| M | K | 1 | N + 4 | $x_0, y_0$ | $x_1, y_1$ | $x_2, y_2$ | $x_3, y_3$ |

Figure 8:
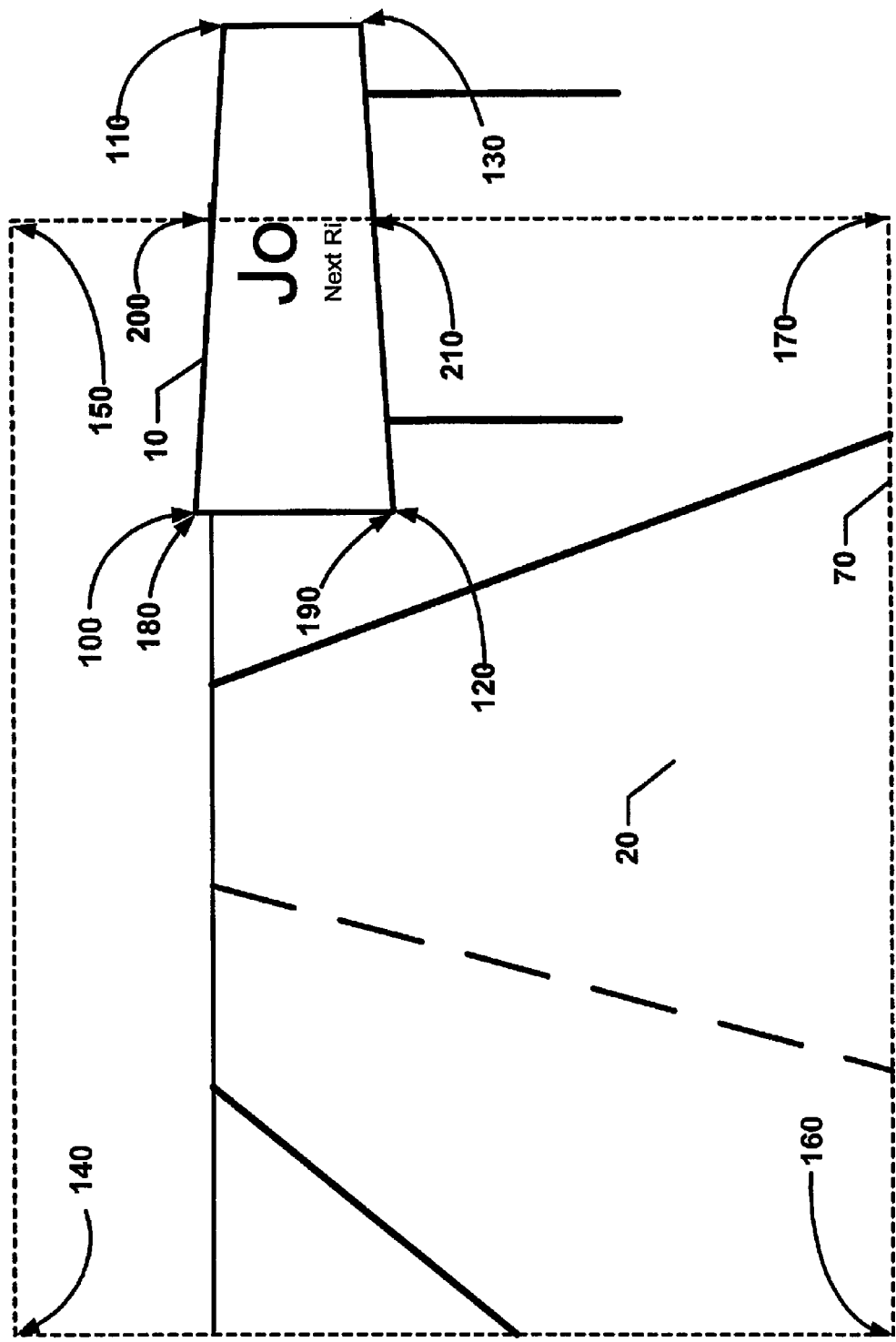
FIG. 8 shows sign polygon definitions for a sign partially within the camera's field of view.

Many image frames will contain partial views of signs since a portion of the sign will typically be outside the camera's field of view. In these cases, one or more of the points $S_0$ through $S_3$ 100, 110, 120, 130 will specify pixels that are outside the image frame. FIG. 8 introduces the points $I_0$ through $I_3$ 180, 190, 200, and 210 which is the image bounding box that defines the area within the image frame onto which the partial new advertisement should be placed. The overlay software will compute the portion of the desired image that needs to be clipped and placed within the $I_0$ through $I_3$ polygon. For ad-spots that are entirely within the image frame, $S_0$ through $S_3$ 100, 110, 120, and 130 will be identical to $I_0$ through $I_3$ 180, 190, 200, 210. With the inclusion of partial signs within the image frames, the ad-spot database would be as shown in Table 3 below:

TABLE 3

| Sign | Run | Cam. | Image# | $S_0$ | $S_1$ | $S_2$ | $S_3$ | $I_0$ | $I_1$ | $I_2$ | $I_3$ |
|---|---|---|---|---|---|---|---|---|---|---|---|
| M | K | 0 | N | $x_0, y_0$ | $x_1, y_1$ | $x_2, y_2$ | $x_3, y_3$ | $x_4, y_4$ | $x_5, y_5$ | $x_6, y_6$ | $x_7, y_7$ |
| M | K | 0 | N + 1 | $x_0, y_0$ | $x_1, y_1$ | $x_2, y_2$ | $x_3, y_3$ | $x_4, y_4$ | $x_5, y_5$ | $x_6, y_6$ | $x_7, y_7$ |
| M | K | 0 | N + 2 | $x_0, y_0$ | $x_1, y_1$ | $x_2, y_2$ | $x_3, y_3$ | $x_4, y_4$ | $x_5, y_5$ | $x_6, y_6$ | $x_7, y_7$ |
| M | K | 0 | N + 3 | $x_0, y_0$ | $x_1, y_1$ | $x_2, y_2$ | $x_3, y_3$ | $x_4, y_4$ | $x_5, y_5$ | $x_6, y_6$ | $x_7, y_7$ |
| M | K | 1 | N + 3 | $x_0, y_0$ | $x_1, y_1$ | $x_2, y_2$ | $x_3, y_3$ | $x_4, y_4$ | $x_5, y_5$ | $x_6, y_6$ | $x_7, y_7$ |
| M | K | 1 | N + 4 | $x_0, y_0$ | $x_1, y_1$ | $x_2, y_2$ | $x_3, y_3$ | $x_4, y_4$ | $x_5, y_5$ | $x_6, y_6$ | $x_7, y_7$ |

FIGS. 3, 4, 5, 6, and 7 illustrate an embodiment of the present invention wherein the ad-spot is a man-made sign along the roadway. For purposes of this invention, an ad-spot can be defined as any geospatial location that can reasonably accommodate an advertisement inserted into the image stream including, but not limited to store windows, building faces, road surfaces, lake surfaces, open fields, mountain tops, rock faces, clouds, trees, car windows, etc.

Figure 9:
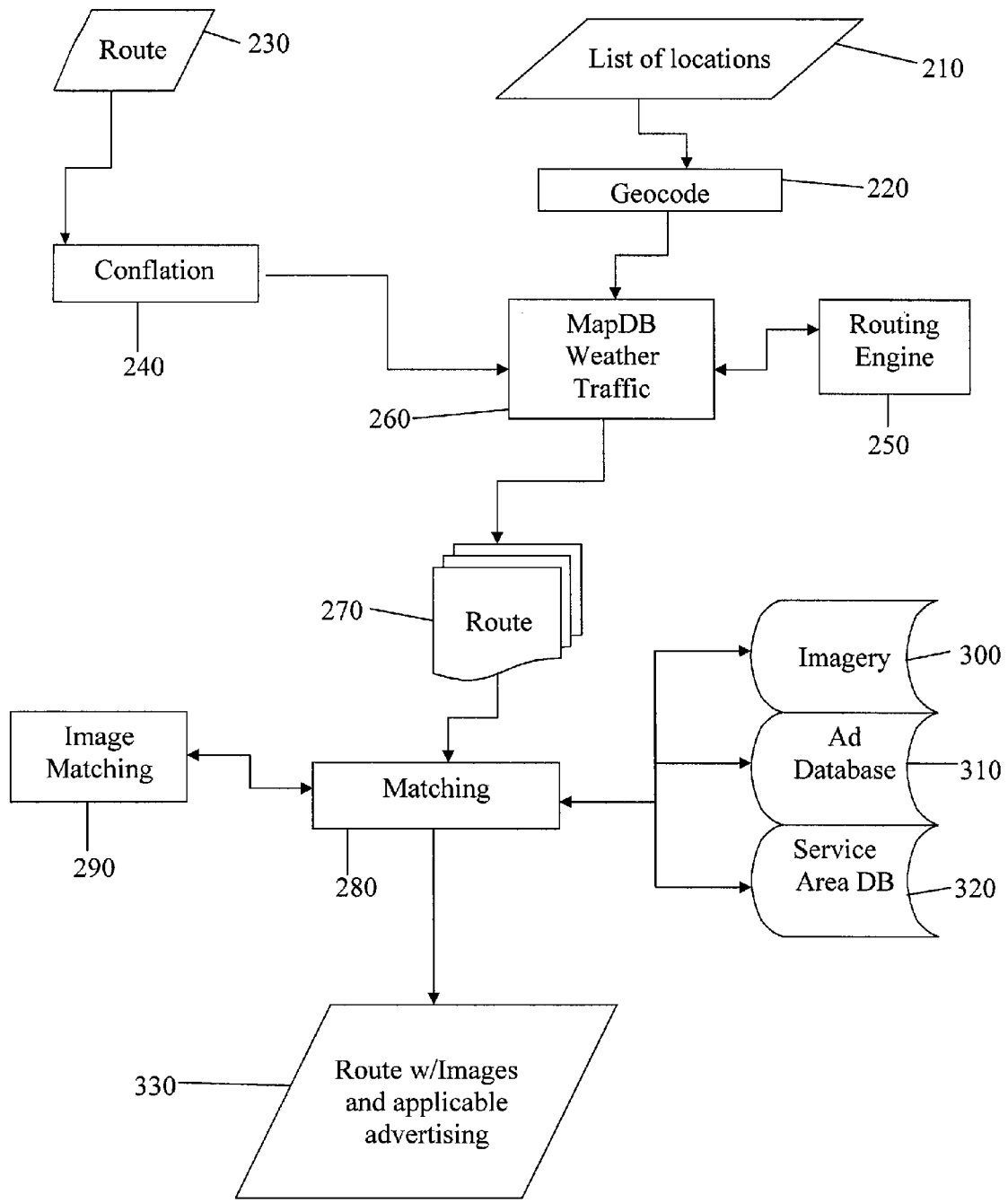
FIG. 9 is an event flow diagram illustrating the operation of a system according to one embodiment of the present invention.
Figure 10:
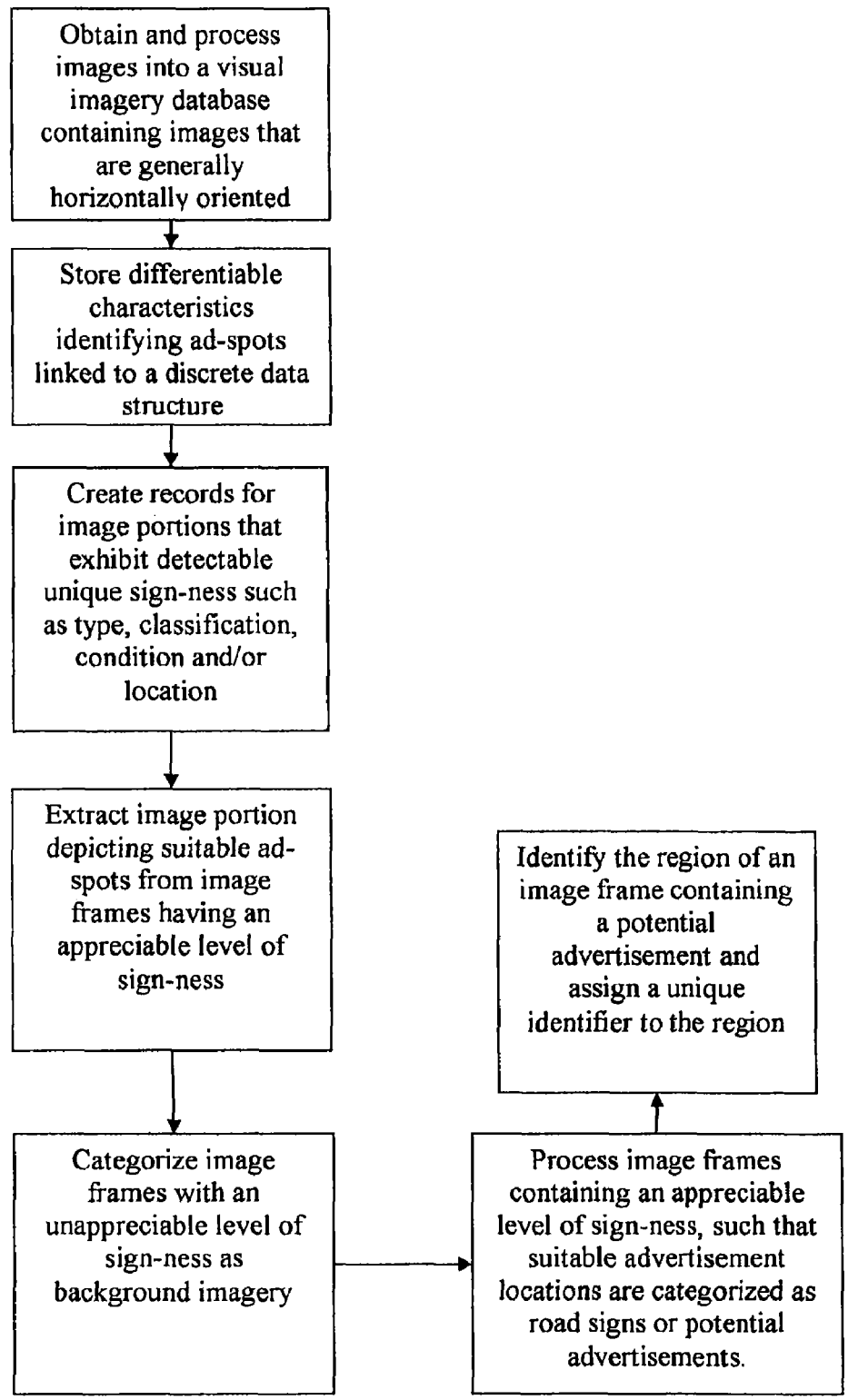
FIG. 10 is a flow chart illustrating the method of identifying ad-spots according to one embodiment of the present invention.

In a general embodiment of the present invention, illustrated in the event flow diagram of FIG. 9, the data collected in a first context, such as for example, the context of an ad-spot, is leveraged to generate additional revenue streams. As discussed above, the processing of the image stream is expanded to retrieve information about regions that likely are advertisement signs or candidates for placement of advertisements. Each of these regions corresponds to a virtual ad-space and like its real property ad-space counterpart the virtual ad-space may be leased, rented, sold or otherwise transacted as part of revenue generating operations. One of the steps in the transaction is valuation of the virtual ad-space. In this regard, each object in the image stream is further linked to other non-navigation related attributes. For example, each object may be linked to a database of addresses, proximity to business centers, demographics, local attractions, traffic density as a function of the time of day and other decisional criteria employed in valuation of an real-property ad-space.

In FIG. 9, another embodiment of the present invention is shown in which the input data is heterogeneous, in that a simple list of locations 210 having geo-spatial coordinates 220 or a complete route 230 made from a different router and map database may be sent to the system. In the case of a route 230 being received, the system requires at least the intersection locations to be provided. Better quality matching will ensue as more data is supplied. Better quality output will be realized when the inputs to the system include full route points, names of streets, and turn direction information. In one embodiment, input data is sent to a heavily hinted conflation engine 240 that matches the desired route data to the system's map data 260. Map data 260 may comprise a map database, weather data, and traffic data, and map data 260 is in communication with a routing engine 250. This is segment-level matching, so the size difference between similar segments in the different databases is not important. Thus, a route 270 is generated of system data with references to the positions that are intersections and turns in the original route 220.

Once route data for a route has been created, the route 270 goes through the imagery matching process 290. The database can be sampled in a variety of ways from highest possible image density where all available imagery is provided to just cross streets or intersections with route changes (turns). In one embodiment, at each identified position for a requested image the image database 300 is queried for the best match 280. Based on the match quality parameters of the request there may or may not be a successful match. Match quality parameters include, but are not limited to DISTANCE, FIELD OF VIEW, AGE, QUALITY and 3D. The images are graded and the best is selected for usage. At the same time a geospatial query is performed on the other databases such as Ad Database 310 and Service Area database 320, with the query parameters including demographic, time of day, service type, buying patterns and potential specific buyer preferences (for example, KFC versus Boston Chicken). A displayable route 330 is then generated, including imagery and applicable advertising.

In one embodiment, the geospatial query for the Ad Database 310 returns the position of ad areas, and the other databases return the appropriate ads. The images can then have the ads inserted, and the appropriate filtering is done to the images. The filtering may correct for light, weather, leaf on, obscuring objects, and other external factors. The filtering will produce an image of the correct and format for the intended user regardless of its relationship to the original imagery. In one embodiment, the route is updateable, by either reprocessing with a new start node and the rest of the route or by just routing back to the route.

In one approach, modeled in part upon the disclosure of U.S. Publication No. 2005/0021472 A1, entitled "Transactions in Virtual Property," and incorporated in its entirety by reference herein, the ad-space transactions may involve end users, advertisers or content site owners, city operators, and a universe operator. End users, who are also termed viewers herein because they may request a destination or a route to a destination or specify a route in the database of roads either for previewing a trip by driving a virtual route on a generic device such as a computer, a hand-held such as a personal digital assistant (PDA), a messaging device, a cellular phone, a game console, interactive TV or the user may request the display on a specialized navigation device, the user may be stationed at a remote location from the requested route or the user may be traveling to the destination along a section of a requested route. In all cases, the present invention will guide the user via the roads in the database to the destination. The guidance takes the form of continually recreating the 3-D imagery surrounding each location along the virtual road as the vehicle travels down the roadway. The imagery displayed is keyed to a line of sight of the driver of the actual or virtual vehicle. Additionally, turn-by-turn instructions may be superimposed on the evolving roadway.

In one embodiment of the instant invention, the user interacts with a remote repository of information through a user interface connected to a network. The term "network" is used here in a very broad sense to denote an interconnected set of nodes at which one or more resources required to effectuate the present invention may be located. A network therefore, may be an intranet, the Internet, a wireless network or any other communication network. The user interface may be a personal computer, a handheld, a cell phone, a dedicated video terminal, an interactive TV monitor or any other device equipped to accept user input and display the results obtained from a locally or remotely implemented route/advertisement related computation.

As illustrated in FIG. 2, the user interacts with a remote server which is in turn connected to a map database, an image database, and an advertisement database. The server or a computing machine connected to the server utilizes code resident on it to process the user request in conjunction with the information in the databases to generate route related imagery and the attendant advertisement that are sent to the user interface for display. In a special embodiment of the present invention, the repository also consists of a database that stores personal demographic/buying preferences. Operationally, the location of the user, the time of day or other user-preference modifiers will be used to select the advertisements to which the user will be exposed.

In another embodiment, at least one of the databases discussed above is located remotely from the user so as to be accessible over the network, whereas the rest of the databases are located locally, for example, on a cell phone or handheld device from which the user is interacting with a network. In an exemplary embodiment, a cell phone that has an image display with the routing data and personal demographic/buying preferences stored locally. Imagery and signage position data are sent based on requests from the phone, which has positional determination in accordance with any of the previously identified techniques (Pull Data Based on Position). Alternately, the imagery and the map data may reside on the local device or be read into the local device using an external repository of information. The positional data system will cooperate with the personalized demographic data and the advertising databases to determine, based on a plurality of factors such as position/time/previous task(s), the advertisements that will be displayed.

One of skill in the art will recognize that every recorded image frame does not have to be processed or displayed, as this will incur huge overhead in terms of computational, storage and access costs. Initial images that are acquired in analog video format may be digitized. The digitized images may be converted to a JPEG or MPEG format data stream to conserve bandwidth, or may be presented as a series or sequence of still images.

As illustrated in FIGS. 1, 3-7, certain locations 10 that carry pre-defined content 52, and therefore tagged as advertisement signs in the pre-processing discussed above are displayed as is at the same or a different location. If a location has been "sold" to an advertiser other than the one advertising at the location in the physical world, the original real-world ad sign is replaced with a different advertisement. Locations that are not used for advertisement purposes in the real world may be suited to carry an ad in the virtual world. The advertisement and/or the entire environment viewed by the driver may be synthetic in that it is artificially created.

Methods and systems to replace advertisements in a video stream are well known in the art. For example, U.S. Pat. No. 6,381,362, entitled "Method and Apparatus for Including Virtual Ads in Video Presentations" and incorporated by reference in its entirety herein, teaches a system for presenting a virtual advertisement or other virtual content in a sequences of frames of a video presentation. The system utilizes data identifying a candidate region in the sequence of frames, a pixel signature for the region, the signature comprising a range of R, G, B values for pixels based on a standard deviation from an average value, and stored virtual content, such as an advertisement, to be implanted in the candidate region or regions. In operation, as frames having the candidate region are processed by an integration system, the alternative virtual content is substituted by default for the candidate region, except if a pixel value in the region falls outside the pixel signature range. The result is an ad that appears to be on a surface in the video presentation, as images that come between the ad and the viewer occlude the advertisement. While it is conceivable to utilize non-polygon shapes and spaces in a video stream for selectively replacement with advertisements, the preferred embodiment of the present invention utilizes polygon shapes having defined boundary edges (e.g., squares, rectangles, etc) to minimize the amount of transformation that is required to map an advertisement from the ad database into the identified replacement region in the actual imagery.

For purposes of the present invention, the Ad Database refers to a set of information that can be inserted into select locations in the images. The "click-through" functionality of the present invention may or may not rely on the Ad Database. Actual advertisements displayed in the actual imagery can be alternately identified and their presence in the imagery can be monetized by charging the original advertiser for click-thrus and/or eyeballs that view the imagery over the network.

In one embodiment, the present invention provides for a counter that is incremented each time a user navigates past a virtual ad. In a separate embodiment, the advertisement may be hyperlinked to allow a user to click on the link and follow it to the merchant's website or place a call to a brick-and-mortar facility. The number of clicks thru an advertisement or the trips down a segment of a roadway where an advertisement is displayed on the virtual roadway is used as a metric to determine the rate the advertiser is charged for the virtual ad. In an alternate embodiment, displayed ads can be tallied and data about views can be stored locally and/or sent for billing determination. Additional revenue streams are generated by providing a gateway for a potential client to navigate to or hyperlink to a particular merchant's brick-and-mortar operation or website respectively. For example, U.S. Pat. No. 6,820,277, entitled "Advertising Management System for Digital Video Streams," incorporated herein in its entirety, teaches an advertisement management system (AMS) in accordance with the principles that consists of one or more subsystems which allow for the characterization of the advertisement, determination of advertising opportunities (avails), characterization of the subscriber, correlation of the advertisement with a subscriber or group of subscribers, and sale of the advertisement, either through a traditional placement (sale), an Internet based sale, or an Internet based auction. The disclosure of this patent may be instructive as to the various ways in which the present invention may be mined for advertisement related revenue generation.

The complete disclosures of the patents, patent applications and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein.

What is claimed:

1. A method of identifying ad-spots within geo-referenced imagery by utilizing sign-ness characteristics of portions of an image frame that depict suitable advertisement locations, the method comprising:
    providing an image database containing actual imagery captured from at least one camera traversed along a physical route, the actual imagery having a generally horizontally oriented perspective;
    storing the sign-ness characteristics in a database as discrete data structures containing one or more information fields relating to the suitable advertisement locations;
    creating records for image portions that exhibit detectable unique sign-ness;
    extracting image portions depicting suitable ad-spots from image frames having an appreciable level of sign-ness;
    categorizing image frames with an unappreciable level of sign-ness as background imagery;
    processing image frames containing an appreciable level of sign-ness, such that the suitable advertisement locations are categorized as road signs or potential advertisements; and
    identifying a region of an image frame containing a potential advertisement and assigning a unique identifier to the region, wherein multiple successive image frames containing the region comprises an ad-spot.

2. The method of claim 1, further comprising conditioning an image frame to increase the desirability of an ad-spot.

3. The method of claim 1, further comprising linking an ad-spot to non-navigation related attributes.

4. The method of claim 1, further comprising determining metrics for the ad-spot.

5. The method of claim 1, further comprising making the ad-spot available to potential advertisers for leasing.

6. A system for the identification of ad-spots within geo-referenced imagery by utilizing sign-ness characteristics of portions of an image frame that depict suitable advertisement locations, the system comprising:
    an image database containing actual imagery captured from at least one camera traversed along a physical route, the actual imagery having a generally horizontally oriented perspective;
    a database containing the sign-ness characteristics as discrete data structures containing one or more information fields relating to the suitable advertisement locations;
    means for creating records for image portions that exhibit detectable unique sign-ness;
    means for extracting image portions depicting suitable ad-spots from image frames having an appreciable level of sign-ness;
    means for categorizing image frames with an unappreciable level of sign-ness as background imagery;
    means for processing image frames containing an appreciable level of sign-ness, such that the suitable advertisement locations are categorized as road signs or potential advertisements; and
    means for identifying a region of an image frame containing a potential advertisement and assigning a unique identifier to the region, wherein multiple successive image frames containing the region comprises an ad-spot.

* * * * *

UNITED STATES PATENT AND TRADEMARK OFFICE
CERTIFICATE OF CORRECTION

PATENT NO. : 7,941,269 B2  Page 1 of 1
APPLICATION NO. : 12/268865
DATED : May 10, 2011
INVENTOR(S) : Laumeyer et al.

It is certified that error appears in the above-identified patent and that said Letters Patent is hereby corrected as shown below:

On Title page 4, item (56), under "Other Publications", Line 20, delete "ELectro-Communications," and insert -- Electro-Communications, --.

Title page 4, item (56), under "Other Publications", Line 20, delete "Traffice" and insert -- Traffic --.

Signed and Sealed this
Ninth Day of August, 2011

David J. Kappos
*Director of the United States Patent and Trademark Office*